(12) United States Patent
Comi et al.

(10) Patent No.: US 7,747,569 B2
(45) Date of Patent: Jun. 29, 2010

(54) SYSTEMS, METHODS, AND LANGUAGE FOR SELECTION AND RETRIEVAL OF INFORMATION FROM DATABASES

(75) Inventors: Gabriel D. Comi, State College, PA (US); Kelly L. Peterman, Port Matilda, PA (US)

(73) Assignee: Raytheon Company, Waltham, MA (US)

( * ) Notice: Subject to any disclaimer, the term of this patent is extended or adjusted under 35 U.S.C. 154(b) by 54 days.

(21) Appl. No.: 11/534,402

(22) Filed: Sep. 22, 2006

(65) Prior Publication Data

US 2008/0077560 A1    Mar. 27, 2008

(51) Int. Cl.
G06F 17/30 (2006.01)
G06F 17/00 (2006.01)

(52) U.S. Cl. .............................. 707/610; 707/999.101; 707/999.102

(58) Field of Classification Search ................ 707/1–6, 707/100–102
See application file for complete search history.

(56) References Cited

U.S. PATENT DOCUMENTS

| | | | | |
|---|---|---|---|---|
| 5,416,917 | A * | 5/1995 | Adair et al. .................. | 707/203 |
| 5,956,727 | A * | 9/1999 | Cheng et al. ................. | 707/102 |
| 6,526,403 | B1 * | 2/2003 | Lin et al. ....................... | 707/4 |
| 6,701,321 | B1 * | 3/2004 | Tsai ............................. | 707/102 |
| 7,016,910 | B2 * | 3/2006 | Egilsson et al. ............. | 707/101 |
| 7,257,594 | B2 * | 8/2007 | Tamboli et al. ............. | 707/101 |
| 2004/0049495 | A1 | 3/2004 | Lee et al. | |

FOREIGN PATENT DOCUMENTS

| | | |
|---|---|---|
| EP | 1 566 746 A1 | 8/2005 |
| WO | WO 02/21259 A1 | 3/2002 |
| WO | WO 0221259 A1 | 3/2002 |
| WO | WO 2004/077277 A2 | 9/2004 |
| WO | WO 2004/077277 A3 | 9/2004 |

OTHER PUBLICATIONS

PCT Communication attaching documents cited in the International Search Report, Jul. 22, 2008. International Search Report (Form PCT/ISA/210) and Written Opinion of the International Searching Authority (Form PCT/ISA/237), for PCT/US2007/020025, Apr. 7, 2008, 21 pages.

(Continued)

*Primary Examiner*—Yicun Wu
(74) *Attorney, Agent, or Firm*—Daly, Crowley, Mofford & Durkee, LLP

(57) ABSTRACT

The invention provides a system configured to enable a first entity to query a second entity for a result, the system comprising a language specification component and an interface between the first entity and the second entity. The language specification component defines a communications language by which the first and second entities can communicate with each other. The interface is operable to receive from the second entity an instance of a generic request that is specific to the second entity, the instance of the generic request providing information about at least one query element that is supported in a second-entity specific request; and convert a first query from the first entity to the second entity into a second query, wherein the second query includes the at least one query element that is supported in the second-entity specific request.

23 Claims, 13 Drawing Sheets

OTHER PUBLICATIONS

Krishnaswamy S et al: "Federated data mining services and a supporting XML-based language" System Sciences, 2001. Proceedings of the 34$^{TH}$ Annual Hawaii International Conference on Jan. 3-6, 2001, Piscataway, NJ, USA, IEEE, Jan. 3, 2001, pp. 986-995, XP010549691, ISBN: 0-7695-0981-9, the whole document.

Amer-Yahia S et al: "A web-services architecture for efficient XML data exchange", Data Engineering, 2004. Proceedings. 20$^{TH}$ International Conference on Boston, MA, USA, Mar. 30-Apr. 2, 2004, Piscataway, NJ, USA, IEEE, Mar. 30, 2004, pp. 523-534, XP010714132, ISBN: 0-7695-2065-0, the whole document.

PCT/US2007/020025 Partial International Search Report dated Mar. 17, 2008.

S. Krishnaswamy, A. Zaslavsky, S.W. Loke, Federated Data Mining Services and a Supporting XML-Based Language, 2001, Proceedings of the 34$^{th}$ Hawaii International Conference on System Sciences, pp. 1-10.

Sihem Amer-Yahia, Yannis Kotidis, a Web-Services Architecture for Efficient XML Data Exchange, 2004, Proceedings of the 20$^{th}$ International Conference on Data Engineering, pp. 1-12.

* cited by examiner

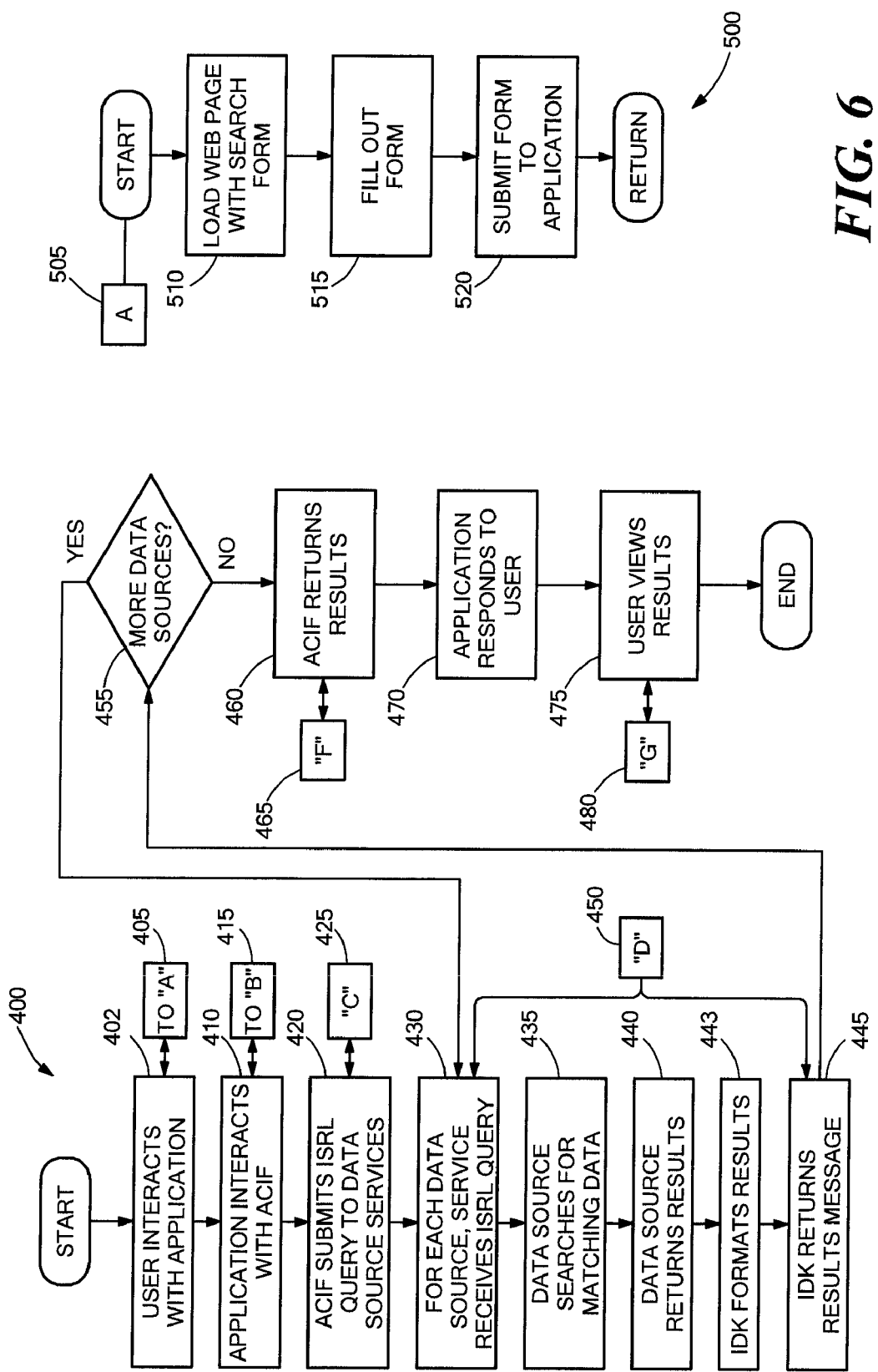

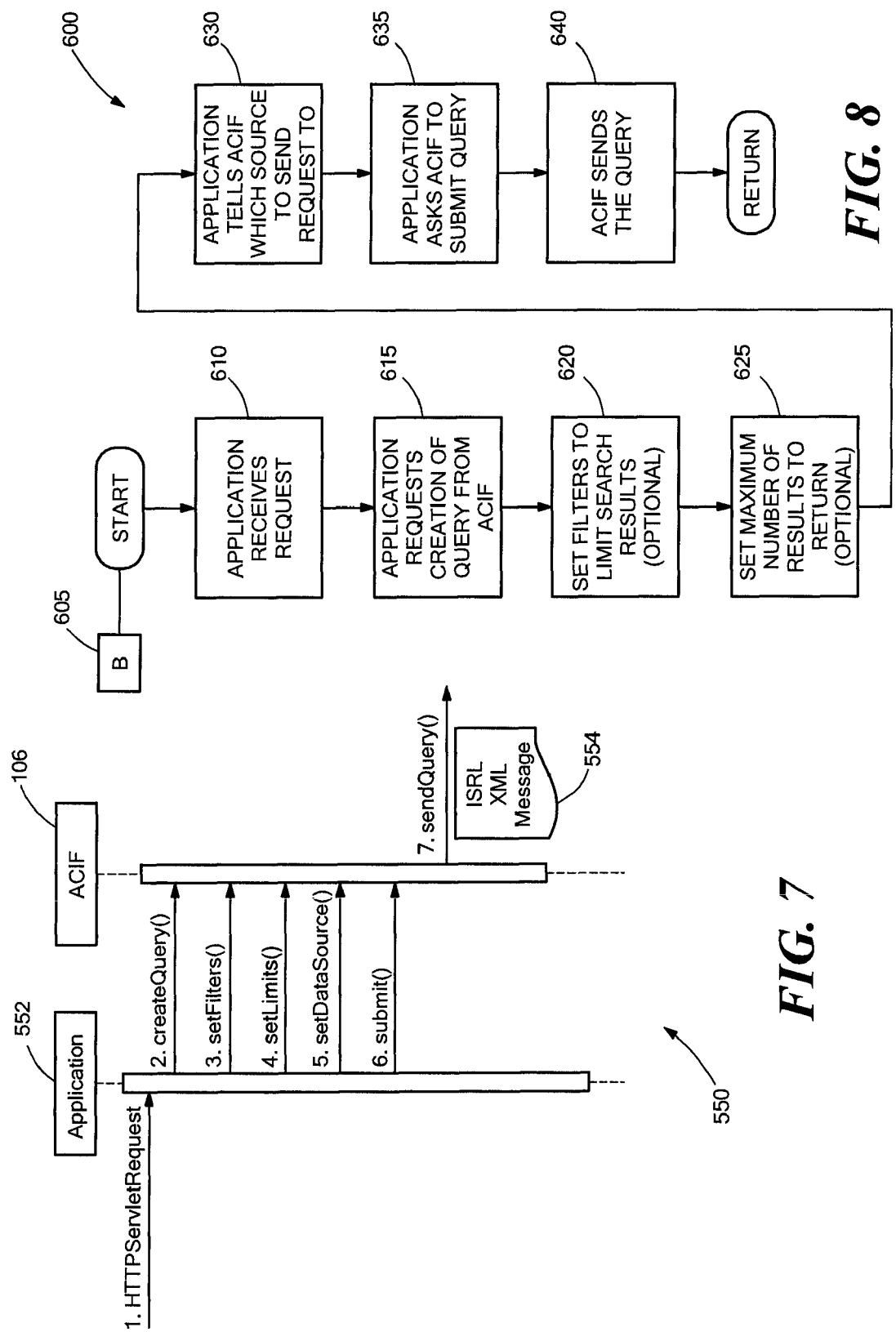

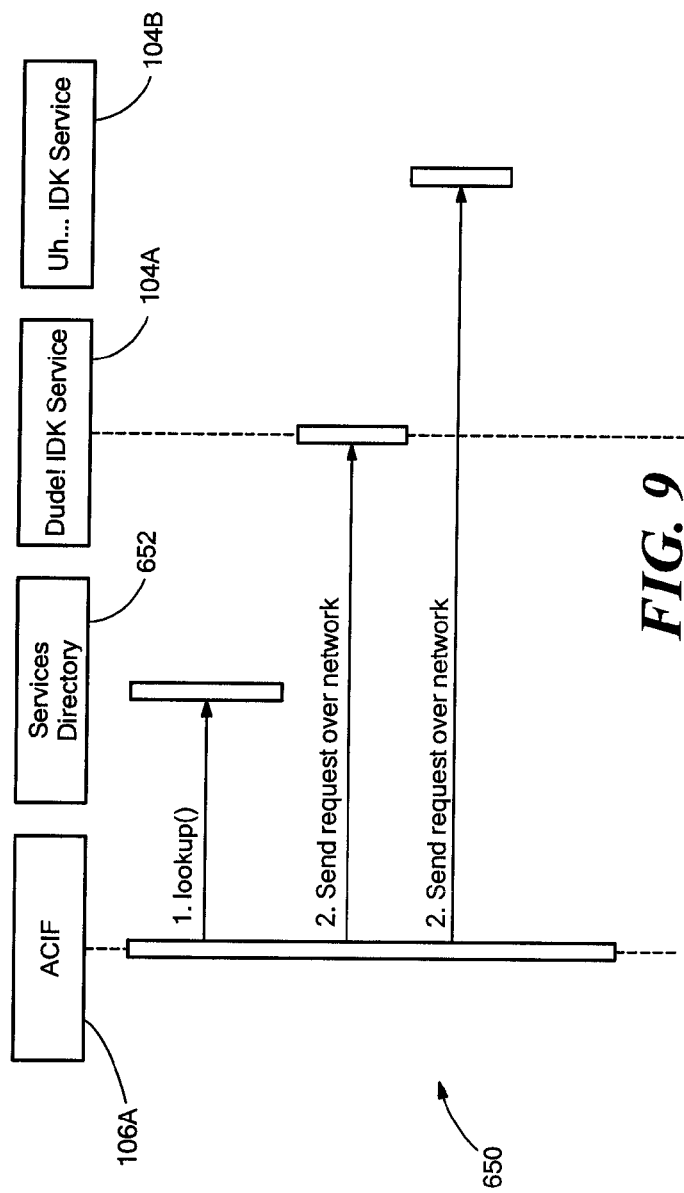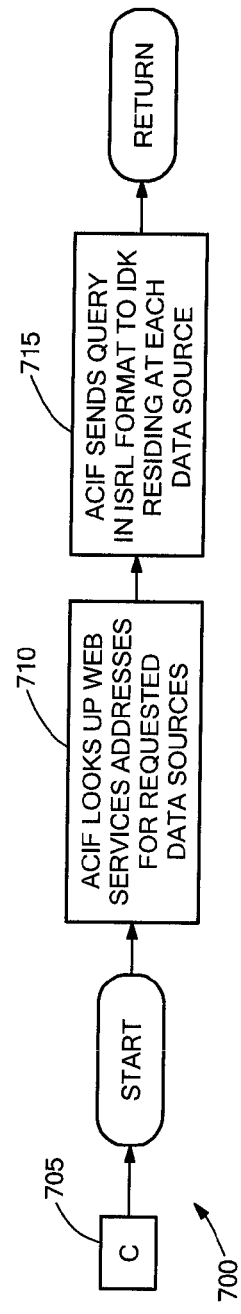

SYSTEMS, METHODS, AND LANGUAGE FOR SELECTION AND RETRIEVAL OF INFORMATION FROM DATABASES

FIELD OF THE INVENTION

Embodiments of the invention generally relate to devices, systems, and methods for databases and methods for accessing such databases. More particularly, the invention relates to systems and methods that enable applications to query and retrieve data from databases having varying architectures and interfaces.

BACKGROUND OF THE INVENTION

Interoperability is one of the biggest problems facing businesses and agencies that operate in data rich environments. One common problem is that many new systems that come on line can only communicate with other systems if the new system develops custom interfaces to the other systems. Many businesses and government organizations are continually working to get data, such as intelligence data, from the collection source into the hands of users, such as analysts, in an efficient manner. For example, the Intelligence Community is continually searching to find a way to make their programs interoperable. Data is being collected, yet is not finding its way to the appropriate analysts. Frequently this is due to incompatibility between the data source and the analysis application. Other times the problem is a matter of geography. For example, an analyst is at one site and the archive is at another with no means to query between the two.

Although efforts are being expended to resolve geographical issues, issues relating to incompatibility are rarely addressed adequately. Further, because of tight budgets at many government agencies, features such as interoperability are sometimes viewed as an unnecessary luxury.

Another reason that past efforts have not always succeeded is that there often is little to no benefit to the developers of the data archive systems to make their data more accessible. Rather, limiting accessibility to data can provide a strategic or business advantage to the holder of a data archive system. For example, by maintaining a firm hold on the data from collection through analysis, these developers can exercise monopolistic control over who and what can see their data.

Past efforts to resolve some of these problems have focused on using so-called data brokers, object brokers, network control programs, and other forms of middleware having varying levels of complexity. Middleware can, for example, include: software that sits between two or more types of software and translates information between them; software that provides a common application programming interface (API); and/or software development tools that enable user to create programs by selecting services and linking the services with a scripting language. While solutions such as middleware sometimes work in the short term, effort has to go into maintaining those tools and updating them when new data sources come online. Also, many middleware data brokers and complexity levels are developed and/or centered on a specific Community of Interest (COI), and, unfortunately, may not be as useful to some other communities, such as the Intelligence community.

In addition, some middleware is information centric, attaching meaning to the data that it is linking or translating. This so-called "heavyweight" middleware tends to use significant amounts of memory and processor resources, which may increase the complexity, cost, and size of the middleware.

While solutions such as those described above may be adequate in the short term, they are very costly to maintain and place a large amount of overhead on the data query and retrieval process.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In one aspect, the invention includes an Intelligence Selection and Retrieval Language (ISRL), a common, open language to search for and retrieve any type of intelligence data, which provides a revolutionary means of solving problems such as at least some of the interoperability problems described herein. This language helps bridge the communications gap while allowing more money to be spent higher in the value chain. At least one market for the invention includes groups such as the United States Government Service Organization (GSO), groups within the Intelligence community, and the Intelligence Community (IC) as a whole. Further embodiments of the invention are useful in virtually any application that involves getting data from any source, such as working, accessing, or searching a database or other collection of information.

In a first embodiment, the invention provides a way to access information without the necessity of using so-called "middleware" or data brokers. Instead, this embodiment of the invention uses a common language and a set of lightweight tools to allow any application to get data from any source, using a language that is referred to herein (for purely illustrative purposes) as the Intelligence Selection and Retrieval Language (ISRL). ISRL is a grammar (language specification) for forming data selection requests and for formatting the results of those requests. Using ISRL, any application can talk to any data source via the common ISRL language.

In addition, the ISRL, in one embodiment, works with one or more tools that help reduce the time and cost required to develop interfaces that speak this new language. One tool is referred to herein (for purely illustrative purposes) as the ISRL Developer's Kit (IDK). The other tool is referred to herein (for purely illustrative purposes) as the Application Connector Interface (ACIF). In one embodiment the IDK and the ACIF can be provided (e.g., via license) to any application or data source developer. In another embodiment of the invention, the ISRL is provided without the ACIF and IDK tools, wherein users develop ISRL interfaces without use of these tools.

Embodiments of the invention may provide advantages of presently available products. For example, embodiments of the invention that implement the above-described ISRL generally require little to no additional maintenance above the cost of maintaining data sources and applications—as long as text and data can be transferred over a network, ISRL can be used. ISRL can be implemented so as to be developer-independent, similar to the features of Hyptertext Markup Language (HTML) and Extensible Markup Language (XML).

In one embodiment, the invention provides a method for a client to query a data source, the method comprising receiving from the data source an instance of a generic request that is specific to the data source, the instance of the generic request providing information about at least one query element that is supported in a data source specific request; and converting a first query from the client to the data source, the first query having a first format, to a second query to the data source, where the second query has a second format that includes the at least one query element that is supported in the data source specific request.

The instance of the generic request can be analyzed to determine at least one publicly accessible query element supported at the data source. The query element can comprise at least one element selected from the group consisting of a field, class, interface, and method. The first format can be a format different from the second format, and the first format can comprise a format associated with a predetermined communications language.

The method, in one embodiment, further comprises:

receiving an initial request from the client to the data source, the initial request being written in a first language;

if the first language is not the same as the predetermined communications language, converting the initial request into a corresponding initial request written in the predetermined communications language; and using the initial request as the first query.

The predetermined communications language can be constructed and arranged to enable a client and a data source to communicate with each other without substantial advanced knowledge of each other's architecture or interfaces. For example, the predetermined communications language can be characterized by at least one standard to which both the client and the data source agree to adhere, such as a standard that defines a message written in the predetermined communications language, the message selected from the group consisting of request messages and response messages. The standard can include a repository of variables used by at least one of the client and the data source, the repository of variables comprising at least one variable selected from the group consisting of parameters, parameter names, parameter precision, parameter value, parameter units, parameter relationships, types, filters, minimum values, maximum values, ranges, and units of measurement.

In one embodiment, the invention provides a system configured to enable a first entity to query a second entity for a result, the system comprising a language specification component and an interface between the first entity and the second entity. The language specification component defines a communications language by which the first and second entities can communicate with each other. The interface is operable to receive from the second entity an instance of a generic request that is specific to the second entity, the instance of the generic request providing information about at least one query element that is supported in a second-entity specific request; and convert a first query from the first entity to the second entity into a second query, wherein the second query includes the at least one query element that is supported in the second-entity specific request.

In a further embodiment, the language specification component further comprises a repository of information relating to at least one parameter used in the system; and a message format for messages written in the communications language, the message format comprising a data description section defining, for a query, the preferred format of a result and defining, for a response to the query, the actual format of a returned result. The interface can be operable to convert a query message written in the communications language into a format specific to the second entity. The repository can further comprise at least one parameter name and wherein the interface is operable to convert the message provided that the second entity uses the at least one parameter name specified in the repository. The interface can be operable to convert the message provided that the second entity implements an interface capable of saving the state of an object in a manner that enables the object to be recreated at a different place or time.

In one embodiment, the invention provides a system enabling a requester to query a data source, the system comprising:

means for defining a communications language that allows the requester and data source to communicate with little or no a priori knowledge of each other's architecture or interfaces; and means for converting a message written in the communications language to a format usable by either or both of the requester and the data source.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein:

FIG. 5 is a flow chart illustrating overall interactions and data flow for a user an application, and a data source, for the embodiment of FIG. 4;

FIG. 6 is a flow chart of the interaction between a user and an application, for the embodiment of FIG. 4;

FIG. 7 is a diagram of the interaction between an application and the ACIF, for the embodiment of FIG. 4;

FIG. 8 is a flow chart of the interaction between an application and the ACIF, for the embodiment of FIG. 4;

FIG. 9 is a diagram of the interaction occurring when the ACIF submits an ISRL query to data source services for the embodiment of FIG. 4;

FIG. 10 is a flow chart of the interaction occurring when the ACIF submits and ISRL query to data source services for the embodiment of FIG. 4;

The drawings are not necessarily to scale, emphasis instead generally being placed upon illustrating the principles of the invention.

DETAILED DESCRIPTION

Before discussing the details of the invention, a preliminary discussion is provided giving an overview of the type of computing environment in which at least some embodiments of the invention are realized. Systems and methods in accordance with the invention can be implemented using any type of general purpose computer system, including but not limited to a personal computer (PC), laptop computer, server, workstation, personal digital assistant (PDA), mobile communications device, interconnected group of general purpose computers, and the like, running any one of a variety of operating systems. An example of a general-purpose computer system 10 usable with at least one embodiment of the present invention is illustrated in FIG. 1.

Figure 1:
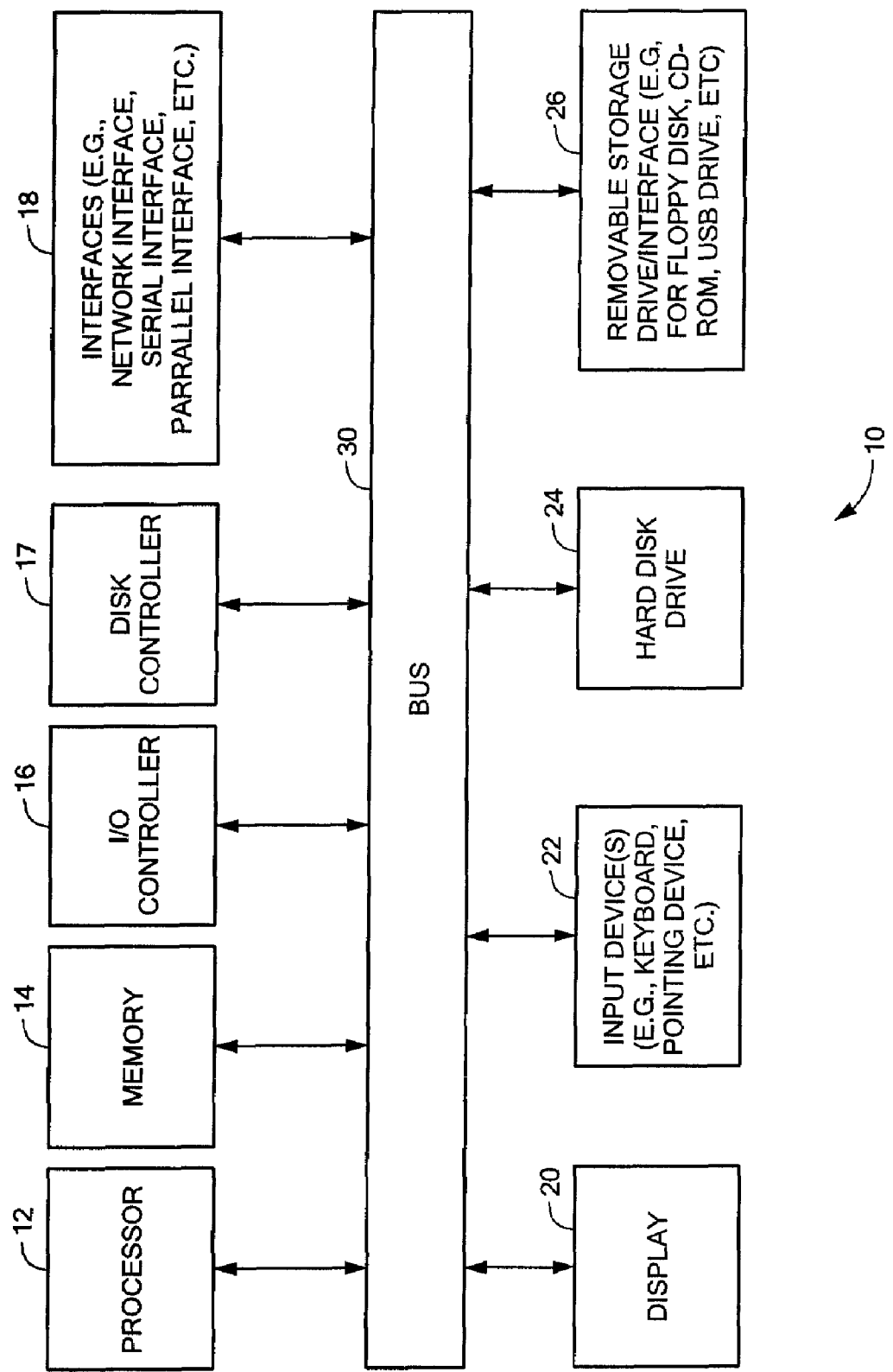
FIG. 1 is a block diagram of a computer system in which at least one embodiment of the present invention can be embodied.

Referring briefly to FIG. 1, the general purpose computer system 10 includes a central processor 12, associated memory 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for methods from computer programs.

In at least one embodiment of the present invention, the computer system 10 is networked to other devices, such as in a client-server or peer-to-peer system. The computer system 10 can, for example, be a client system, a server system, or a peer system. In one embodiment, the invention is implemented at the server side and receives and responds to requests from a client, such as a reader application running on a user computer.

The client can be any entity, such as a the computer system 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM®, LINUX, OS/2® or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that sends or forwards the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying the present invention, in one embodiment, resides in an application or other program running on the computer system 10. In at least one embodiment, the present invention is embodied in a computer-readable program medium usable with the general-purpose computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. The present invention also, in an embodiment, is embodied in an application programming interface (API) or a user interface. In addition, the present invention, in one embodiment, is embodied in a data structure.

Having described examples of computing environments, illustrative embodiments of the invention will now be described. Note that, in the following description, the communications language described herein is illustratively shown as a database retrieval language and is given the name of "Intelligence" selection and retrieval language (ISRL) by way of example only. Those of skill in the art will recognize that this name is in no way limiting. The communications language can be used with applications other than database retrieval, and use with the "Intelligence" community is but one application of the invention. At least some of the embodiments of the invention described herein, including the described intelligence selection and retrieval language, have applicability and utility in virtually any type of environment where a first entity is required to communicate with a second entity, such as when a user is required to access one or more data sources. Further, at least some of the embodiments of the invention described herein are particularly useful when the first entity and the second entity have little or no a priori knowledge of each other's architecture or interfaces.

Figure 2:
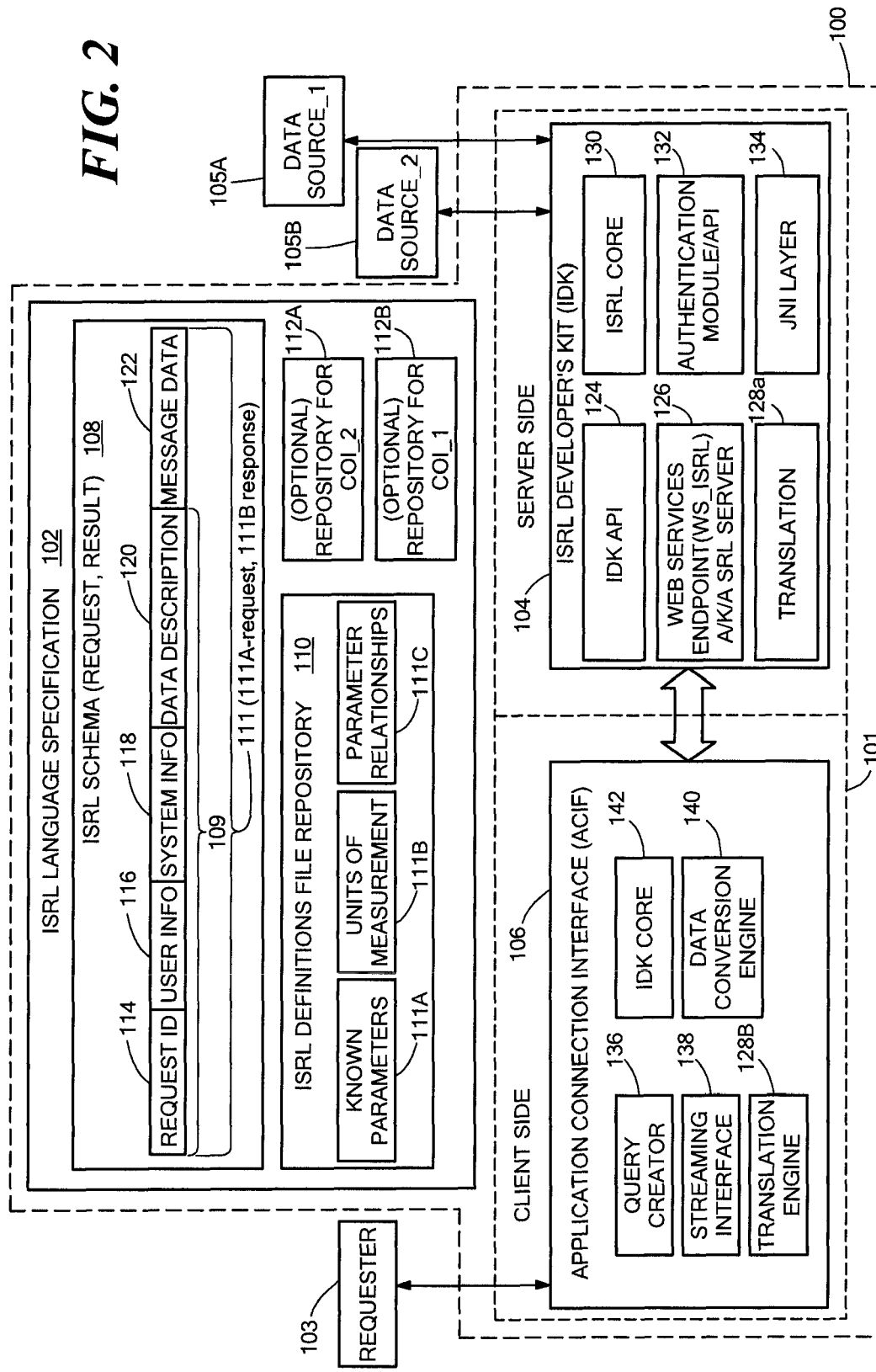
FIG. 2 is a block diagram illustrating the elements of a system implemented in accordance with at least one embodiment of the invention.

FIG. 2 is a block diagram illustrating the elements of a communications language system 100 (illustratively shown as an Intelligence Selection and Retrieval Language (ISRL) system 100) implemented in accordance with at least one embodiment of the invention. The ISRL system 100 operates over a computer network 101, having client side and server side functionality. The client can be virtually any entity, as described previously, and in the system 100 the client is shown as a requester 103. Similarly, the server can be virtually any entity, as described previously, and in the system 100 data sources 105A and 105B each are servers.

The ISRL system 100 includes three components, each of which helps to contribute to the functionality of the ISRL language. These components include the ISRL language specification (ISRL Spec) 102, Application Connector Interface (ACIF) 102, and the ISRL Developer's Kit (IDK) 104. A requester 103 (such as an application, another computer system, a user, or another entity) communicates with one or more data sources 105 via the system 100.

The ISRL spec 102 defines the ISRL, which provides, in accordance with one embodiment of the invention, an XML based special purpose communications language that allows data sources and applications to communicate with little or no a priori knowledge of each other's architecture or interfaces. The ISRL itself is characterized by one or more standards documents to which implementing programs agree to adhere. For example, in one embodiment, the standards documents include an ISRL Schema 108 and an ISRL Definitions File 110, which together provide all of the information necessary to communicate using ISRL. Advantageously, the ISRL Schema 108 and ISRL Definitions file 110 can be versioned and configuration controlled by a single entity, where users, such as members of the Intelligence community, can make change requests. In other embodiments the ISRL is implemented in an "open source" manner, permitting users to maintain and change the standards documents.

The ISRL schema 108 operates as a "grammar" for the ISRL and defines two broad categories of IRSL messages 111: request messages 111A and result messages 111B. Each message category has common base structure, which is a header 109 followed by message data 122.

The ISRL header 109 contains the following sets of information: a request identification (request ID) section 114, a user information (user ID) section 116, a system information section 118, and a data description section 120. Note that, although FIG. 2 depicts the sets of information in the ISRL header 109 as sequential adjacent fields, the illustration is purely for illustration only and not intended as limiting.

The Request Identification section 114 contains an ASCII string that uniquely identifies the ISRL request. Since not all ISRL requests will result in a synchronous response, the Request Identification allows the client and server to do transaction management.

The User Information section 116 of the ISRL header 109 contains authentication information used by the system 100. In the illustrated example embodiment, the authentication information consists of a user ID. Optionally, the authentication information includes a public key encryption (PKI) user certificate. If a PKI user certificate is not present, the request preferably comes from a requester 103 or other entity known to be trusted by the receiver, where a receiver can be any entity or system receiving the request. This trust is established outside of ISRL, but is confirmed in the System Information section 116 of the header (described below).

The ISRL header 109 contains a System Information section 116 that allows the receiver (e.g., a data source 105) to verify that the request came from a valid hostname and IP address. In addition, a server PKI certificate is passed to the receiver for system validation. While the ISRL system 100 of the illustrated embodiment generally does not itself establish trust or verify user credentials, the ISRL system 100 provides a number of mechanisms by which implementing systems can do so.

The last part of an ISRL header 109 is a Data Description section 120. The Data Description section 120 is the section of the ISRL header that helps allow clients (e.g., requester 103) to request information from data sources 105 without knowing anything about the data source 105 and vice versa. The Data Description section 120 defines the preferred (request) or actual (result) format in which results should be formatted. For example, this format can be a custom XML or CSV based record format or it can be one of numerous existing formats. Provided that the receiver can return results in the requested format, the actual data description returned from a request will match the description sent in the Data Description section 120. In the event that the format requested cannot be provided, the data source 105 responding to a Request 111A makes its best effort in the response 111B to fulfill the request 111A as completely as possible. Thus, the Data Description section 120 of the response 111B reflects the actual results that were returned in the response instead of the requested format that had been requested in the Data Description section 120 of the request 111A.

In addition to data format specifications, the Data Description section 120 also is used to define the way in which the results should be returned and the limits on how much data to return. Transfer mechanism definitions are useful when the results are very large and streaming them as part of the data result is not practical. The limits specified in the Data Description section 120 of a request message 111A are complimented by a size field returned in the Data Description section 120 of the response 111B that reports how much data or how many records are being returned.

The message data section 122 (the body of the message 111) is where the requests 111A and results 111B messages (also referred to herein as responses 111B) differ drastically. The message data section 122 of a request message 111A preferably includes a time filter and any number of other parametric filters. The time filter specifies a date/time range from which to select data for retrieval. The parametric filters define the type of match, for example single value match, range match, and/or multiple value matches. For example, if a time filter is a used, a requester (i.e., the entity generating a request message 111A) can specify if data matching the filter should be included in the results or excluded from the results. The requester also can specify the precision and units of the filter values. Advantageously, few restrictions are placed on the filters in a request message 111A, and the only restriction on the filters is that the parameter name and units match a value defined in the ISRL Definitions File.

The message data section 122 of a result message 111B can take several forms. For example, in the event that no results were selected or the results were sent to the requester along another path, then the message data section 122 of the result message 111B contains no body at all. Alternately, the message data section 122 of a result message 111B contains the actual results of the query. These query results may be binary data or text records.

Referring again to FIG. 2, the ISRL Definitions File 110 (also referred to as the ISRL repository 110) is a storehouse of variables (e.g., all known parameters, units of measurement, and parameter relationships) used with the system 100 (e.g., variables that can be part of a message 111). Although the embodiment of FIG. 2 illustrates only a single ISRL Definitions File 110, other embodiments of the invention include different and/or additional (optional) repositories 112A, 112B, e.g., for different Communities of Interest (COI) such as Counter-Terror, Non-Proliferation, etc., as those of skill in the art will appreciate.

The ISRL Definitions File 110 contains XML records for each parameter or unit of measurement. Additional units or parameters can easily be added at any time. Tables 1 and 2 below are examples of a parameter definition and some unit definitions.

TABLE 1

ISRL Definitions Parameter Example

```
<parameter>
    <name>radius</name>
    <baseUnit>meter</baseUnit>
</parameter>
<parameter>
    <name>frequency</name>
    <baseUnit>hertz</baseUnit>
    <equivalent>rf</equivalent>
</parameter>
```

TABLE 2

ISRL Definitions Unit Example

```
<unit>
    <name>meter</name>
</unit>
<unit>
    <name>inch</name>
    <baseUnit>meter</baseUnit>
    <factor>0.0254</factor>
</unit>
<unit>
    <name>kilometer</name>
    <baseUnit>meter</baseUnit>
    <factor>1000</factor>
</unit>
```

Referring again to FIG. 2, the system 100 also includes an ISRL Developer's Kit (IDK) 104, which is a tool (including its own suite of tools) built upon the ISRL language. The IDK 104 aids programs and/or data source developers in writing translators that convert ISRL requests and responses to program and/or data source specific formats. For example, the IDK 104 provides all of the tools that a data source developer needs to quickly and easily make a data source ISRL compliant. Advantageously, the system 100 implements a single IDK 104 that can be licensed and used by entities that want to develop an ISRL interface. Licensing and using the IDK 104 can be the most cost effective way for many entities to develop an ISRL interface; however, in at least some embodiments of invention, an ISRL interface can be developed without using the IDK 104.

There are six components that make up the IDK 104: a Web Services Endpoint (WS_ISRL) (also referred to herein as an ISRL Server) 126, an ISRL Core 130, a Translation Engine 128A, an IDK Application Programming Interface (IDK API) 124, an Authentication Module/API 132 and a Java Native Interface (JNI) Layer 134. Each of these is described further below.

The Web Services Endpoint 126 is an application that provides a near plug and play web service capability to data sources 105. This application, referred to herein for illustrative purposes as ws-ISRL, is installed into a Java 2 platform Enterprise Edition (J2EE) compliant application server or deployed within a web server capable of supporting servlets and JavaServer pages (JSPs), such as a Jakarta Tomcat J2EE container (available as an open source product from the Apache Software Foundation, Forest Hill, Md. or via http://www.apache.org). For example, in one embodiment, the Web Services Endpoint 126 is implemented as a Tomcat based server that actually is provided with the IDK 104. The Web Services Endpoint 126 accepts web service requests and translates/passes the requests to an implementing service.

Once installed, the ws-ISRL application of the Web Services Endpoint 126 listens for incoming ISRL messages and passes them to a message handler. In one embodiment, this message handler is a custom message handler developed specifically for a given data source 105. In the illustrated implementation of the IDK 104, developers of a data source 105 can choose to execute any of a number of pre-defined behaviors upon receipt of a message by altering the ws-ISRL configuration file, FIG. 11 (described further herein) shows the flow of data between the ws-ISRL application 802 of the Web Services Endpoint 126 and the data source 105.

Referring again to FIG. 2, the ISRL Core component 130 is an implementation of the ISRL language. Advantageously, the ISRL Core component 130 can be a proprietary component that is licensed to data source developers Implemented in Java. The ISRL Core component 130 contains all of the classes necessary to process any ISRL message and return a properly formatted result. In addition, the ISRL Core component 130 provides the base abstract classes that, when implemented by a data source, allow for rapid translation between ISRL and custom data source implementations.

The ISRL Core 130 contains packages (e.g., collections of related objects or components) corresponding to a model of the request XML message, a model of the response XML message, base object and implementation classes, and a parameter and init definition model. For example, the packages in the ISRL core 130 map to the different XML documents and contain objects and methods for reading and interpreting the respective XML document(s) with which the packages are associated. The ISRL Core component also contains a set of test GUIs that can perform data requests, parse results, and validate messages.

The Translation Engine 128A (also referred to herein as a translator) translates ISRL formatted messages into data source specific formats. This is a powerful capability that provides a fast, easy to use, and reliable way to translate into data source specific formats. As explained further herein in connection with FIGS. 12-14, the Translation Engine 128A provides a two-pass translation from an ISRL common format to an implementation specific format. In one embodiment, the Translation Engine 128A takes advantage of the introspection capabilities that are native to the Java language to be able to translate a request into any implementation specific format that follows certain coding standards, explained further below.

Figure 13:
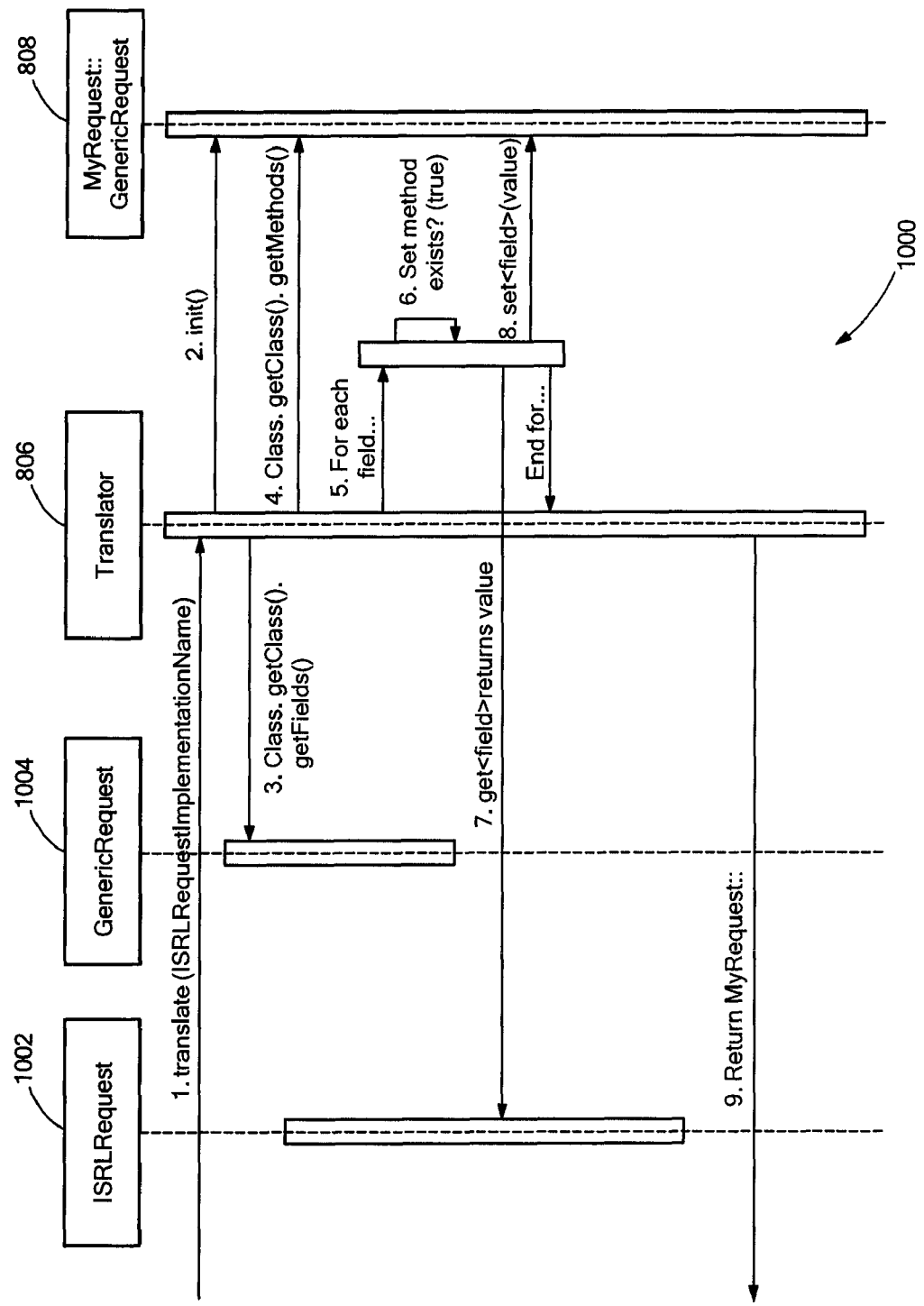
FIG. 13 is a diagram showing translation of in detail for the embodiment of FIG. 4.

Utilizing Java's introspection capabilities, the Translation Engine 128A takes an ISRL message and translates it into a data source specific format provided that the data source 105 provides an implementation class that meets two very basic requirements: first the implementing class must implement an interface capable of encoding or writing or saving the state of an object in a structured way so that the object can be saved or transmitted as data and recreated at another place/time (such as a Serializable interface); second, the implementing class must use parameter names specified in the ISRL Definitions File. Provided that those two requirements are met, the implementing system does not need to know anything else at all about ISRL. FIG. 13 (described further below) is a flow diagram that further details how the Translation Engine 128A works.

Referring again to FIG. 2, the IDK API 124 of the IDK 104 is a component that lies on top of all of the other components (that is, the IDK API 124 is a component that logically encapsulates the IDK 104 and provides a publicly exposed interface through which all components of the IDK 104 are accessed) and is the so-called "public face" of the IDK 104. That is, in this embodiment, the IDK API 124 is a component (as is the Authentication API 132, described below) that is completely public and open (i.e., accessible) to developers, such as data source providers 105.

In an example embodiment, the IDK API 124 is implemented almost entirely via documentation; examples of the types of such documents could include:
 Javadoc for the abstract base classes
 Developer's Guide
 Installation Guide
 Getting Started Guide
 Examples
  Request message translation
  Response message translation
  ws-ISRL Message Handler example
 Reference Documents
  ISRL Schema
  ISRL Definitions File The Authentication Module/API 132 of the IDK 104 is a component that helps enable legacy systems to operate in a secure environment. The authentication Module/API 132 provides a set of authentication modules that can be plugged into the ws-ISRL component of the Web Services Endpoint 126 to ensure that all messages are property authenticated. In an example embodiment, the Authentication Module/API 132 of the IDK is implemented using a set of simple authentication modules that includes:
 UNIX
 SQL RDBMS
 .htaccess
 Certificate In addition, the IDK 104 provides an open API for the creation of other authentication modules so each data source and make sure they meet their own specific security requirements.

The JNI Layer 134 allows the IDK 104 to work with systems developed in C or C++. This is advantageous because many archive systems, applications, and data brokers have some level of C++ or Java compatibility. Thus, the JNI layer 134 helps to make the IDK 104 suitable for many users. The JNI layer 134 is a set of interfaces and libraries that expose the IDK API to C++ developers. In addition, a set of documentation and examples exists to make it easier for C++ developers to quickly create ISRL capable interfaces.

Referring again to FIG. 2, the system 100 includes an ACIF 106. The ACIF 106, which is intended for use by application developers and maintainers, "complements" the functionality of the IDK 104. For example, where the IDK 104 includes tools to aid the data source developer in creating an ISRL compliant interface, the ACIF 106 provides a similar level of support for application development. The ACIF 106 provides a set of tools that take ISRL Common Formatted Results (which are explained further herein) and turns the results into legacy formats for use by applications. As illustrated in FIG. 2, the ACIF 106 includes a Query Creator 135, a Streaming Interface 138, a Data Conversion Engine 140, an IDK Core 142, and a Translation Engine 128B. Each of these is further explained below.

The Query Creator 136 is a graphical user interface (GUI) tool that assists developers (especially developers new to ISRL) to develop ISRL language request templates for use by applications that they are developing and to develop implementing Java classes for plug-ins to the application. In addition, the Query Creator 136 also supports custom results definitions and/or selection of a pre-existing results format. Supporting custom results definitions and/or selection of a pre-existing format can help reduce the development time and effort required to make an application capable of working with ISRL capable.

The Streaming Interface 138 is a connector that allows legacy applications to become ISRL compliant. For example, some legacy applications and/or tools expect data queries to be synchronous. The Streaming Interface 138 acts as a "wrapper" around ISRL that mimics a synchronous interface for legacy applications that need to be able to do requests as a single transaction (i.e., the Streaming Interface 138 acts as a proxy to ISRL.) Once the Streaming Interface 138 receives a data request from the application (e.g., from a Requester 103), the Streaming Interface 138 submits an ISRL data request to the applicable server or servers. The Streaming Interface 138 then issues status requests (a special form of data request) to the servers for the data source 105 and compiles results as they come back. Once all of the results are in, the Streaming Interface 138 calls the Data Conversion Engine 140 to translate the results into the selected format and returns the results to the application.

While a number of asynchronous operations can take place in the above-described scenario, the scenario in actuality appears to be totally synchronous to the application (i.e., the tools enable dynamic loading of data based on user requests). In addition to being useful for legacy applications, the Streaming Interface 138 can be used by new application developers that only require a simple search and retrieval interface and don't want to bother with status tracking and the like.

The Data Conversion Engine 140 is a utility that transforms/converts ISRL results (or other supported data formats) into user requested formats (e.g., one of many commonly used formats.). As those of skill in the art will appreciate, many different types of data conversion utilities are available commercially (e.g., programs that convert spreadsheet documents into comma separated text files, programs that convert proprietary word processing formatted files (e.g., MICROSOFT WORD document) into device independent and resolution independent fixed layout document formats (e.g., portable document format (PDF), etc.). Data conversion utilities can be used as "plug ins" to the Data Conversion Engine 140. The Data Conversion Engine 140, in the embodiment of FIG. 2, is built on top of the Translation Engine 128B and contains a number of customized result classes that can output ISRL results in one of many formats that are currently in use by existing applications.

The Translation Engine 128B operates similarly to the Translation Engine 128A described previously in connection with the IDK 104. Likewise, the IDK Core 142 operates similarly to the ISRL Core 130 described previously in connection with the IDK 104.

Figure 3:
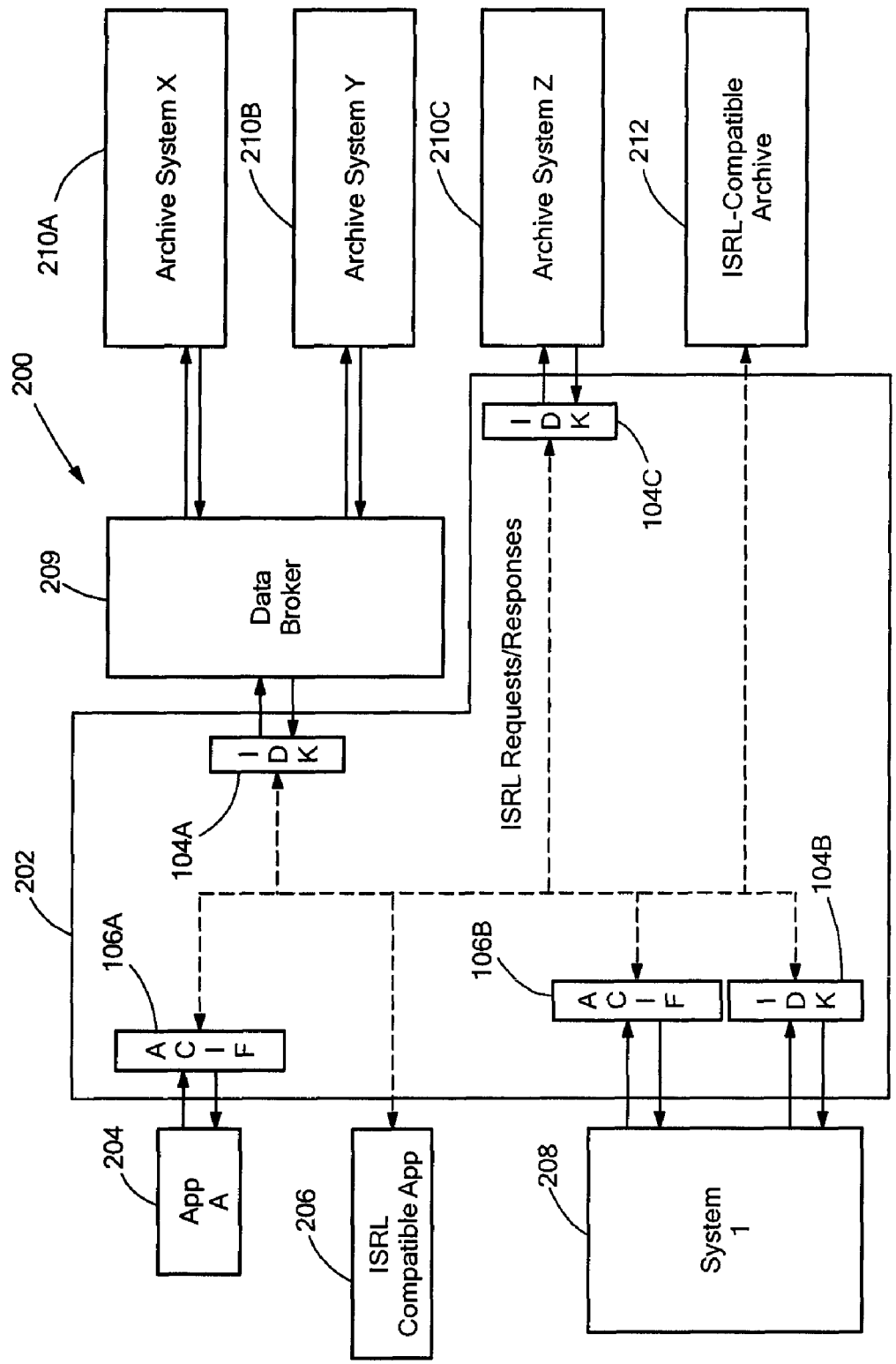
FIG. 3 is block diagram of an enterprise layout, in accordance with one embodiment of the invention.

To form a truly interoperable enterprise, it is advantageous for the ISRL system 100 to be able to be adapted and/or implemented in various differing operational situations. FIG. 3 is block diagram of an enterprise layout 200 that illustrates how the system 100 of FIG. 2 can be implemented and adapted in an enterprise environment that includes varying operational situations. Referring to FIG. 3, examples of such operational situations include (but are not limited to);

1. Data Broker—A configuration that uses a system (e.g., Data Broker 209) having the ability to federate data requests to legacy archives (System_X 210A and Archive System_Y 210B) via the IDK (e.g., IDK 104A).
2. Data Archive with the IDK—A configuration where a data source (e.g., Archive System_Z 210C) uses the IDK (e.g., IDK 104C) as an ISRL compatible interface.
3. Dual Use System—A configuration where a system (e.g., System_1 208) acts as both a data source and a client application.
4. Application with ACIF—A configuration where an application (e.g., the analysis application App_A 204) utilizes ACIF (e.g., ACIF 106A) for ISRL compatibility.
5. Native Compatibility—A configuration where a system and/or its elements have built in ISRL compatibility (e.g., ISRL Compatible App 206 and ISRL Compatible Archive 212) rather than utilizing the IDK or ACIF Note also that, in FIG. 3, all communications between and among the ACIFs 106A, 106B, IDKs 104A, 104B, and 104C, ISRL compatible application 206, and ISRL compatible archive 212 (which communications are shown via dotted lines in FIG. 3) are done using a common communications language: ISRL. These communications are illustrated in FIG. 3 via a dotted line.

Data brokers such as Data Broker 209 are commercially available to communities such as the Intelligence Community as a way to provide access to a number of data sources from a single interface. Conventionally, a data broker takes an incoming request for data and federates it to all of its associated data sources. Data brokers can be implemented, for example, to have a programmatic interface to applications or other systems or a direct user interface.

In FIG. 3, Data Broker 209 uses IDK 104A to handle ISRL formatted messages. These ISRL formatted messages can come directly from a system/entity with built in ISRL capability (e.g., ISRL Compatible App 206) or from a system/entity that has used an IDK as an ISRL compatible interface (e.g., App_A 204 and/or System_1 208). To become ISRL capable, the Data Broker 209 is adapted (such as by the developer of the Data Broker 209) by taking the following actions:

1. Access the IDK, such as via a license, if necessary (optional).
2. Generate a custom Web Service Request Handler.
3. Generate custom Request and Result message classes.
4. Install ws-ISRL (FIG. 2) and the IDK libraries (e.g., from JNI layer 134 of FIG. 2) into the system in which the data broker is used.
5. Register the web service endpoint address so that applications and systems know the interface is available for query.

Once the interface (e.g., IDK 104A) is active, any application or system within the enterprise can issue an ISRL request for data to the data broker by sending an ISRL Data Request message to the web service, Referring to both FIG. 2 and FIG. 3, upon receipt of the ISRL message (e.g., a request for data from a data source 105), the IDK 104A and Data Broker 209 perform the following actions in a first data flow, in accordance with an embodiment of the invention.

1. ws-ISRL 126 receives an ISRL compliant request message (e.g., from ISRL Compatible App 206 or via ACIF 106A from App_A 204 or via ACIF 106B from System_1 108) and passes the ISRL compliant request message to the custom request handler. The custom request handler is a request handler that has been customized to work with a given data source.
2. The request handler calls the Translation Engine 128a to translate the request into the custom format (e.g., a format that has been customized for the data source).
   2a. Alternately, if the request message is not ISRL compliant, a result message is sent to the requester with an error status.
3. The request handler passes the message to the Data Broker 209 for processing
4. The Data Broker 209 federates the query to its associated data sources (e.g., Archive System_X 210A and/or Archive System_Z 210B).
5. The Data Broker 209 returns request results in custom format
   5a Alternately, after the Data Broker 209 sends the results header to the request handler; it sends the result data along the in the manner specified in the request (such as via a Secure File Transfer Protocol (SFTP)).
6. The request handler calls the Translation Engine 128A to convert the results into ISRL format.
7. The request handler sends the result message to ws-ISRL 126.
8. ws-ISRL sends a Date Result message as a return result from the Web Service call.

Referring again to FIG. 3, it can be seen that some data sources, such as Archive System_Z 210C, are not connected to the data broker 209. One reason that this arrangement can exist is that it can be expensive to add data sources to a data broker. With the embodiment of the invention shown in FIG. 3, it may be more economical to develop a new archive with ISRL support. Any ISRL compatible client can then query this new archive without the need for an intermediary such as a data broker. Developing a new archive with ISRL support further has the added benefit of increasing query responsiveness since middleware is being removed.

The scenario where a new archive (e.g., Archive System_Z 210C) is developed with ISRL support operates in a manner similar to the data broker scenario described above. To become ISRL capable, the developer of this archive does the following:

1. Access the IDK, such as via a license, if necessary (optional).
2. Generate a custom Web Service Request Handler.
3. Generate custom Request and Result message classes.
4. Install ws-ISRL (FIG. 2) and the IDK libraries e.g., from JNI layer 134 of FIG. 2) into the system.
5. Register the web service endpoint address so that applications and systems know the interface is available for query.

Once the interface (e.g., IDK 104C in FIG. 3) to the new archive (Archive System_Z 210C) is active, any application or system within the enterprise 200 can issue an ISRL request for data to the archive by sending an ISRL Data Request message to the web service. Referring to FIGS. 2 and 3, upon receipt of the message, the IDK 104C and Archive System_Z perform the following actions:

1. ws-ISRL 126 receives the message and passes it to the custom request handler.
2. The request handler calls the Translation Engine 128A to translate the request into the custom format.
   2a Alternately, if the request message is not ISRL compliant, a result message is sent to the requester with an error status.
3. The request handler passes the message to Archive System_Z 210C for processing.
4. Archive System_Z 210C searches for data that matches the request filters.
5. The archive returns request results in custom format.
   5a Alternately, after Archive System_Z 210C sends the results header to the request handler, Archive System_Z 210C sends the result data along in the manner specified in the request (e.g., SFTP).
6. The request handler calls the Translation Engine 128A to convert the results into ISRL format.
7. The request handler sends the result message to ws-ISRL 126.
8. ws-ISRL sends a Date Result message to the requester as a return result from the Web Service call.

Some systems, especially within the Intelligence Community, can serve as both Applications and Data Archives. These are referred to herein as dual use systems. An example of a dual use system is System_1 208 in FIG. 3. Dual use systems act as applications in various ways; for example, dual use systems provide an analysis capability to users and/or may provide access to (either locally stored or acting as a data broker) data (e.g., consumer data) from other systems. In either the analysis capability or the situation where data is obtained from other systems, it is beneficial to use the ACIF 106 to connect the dual use system to other ISRL capable data sources. Dual use systems act as data archives in various ways, such as by performing a value added function to the incoming data and storing it or acting as a short or long term archive for another system.

The operational scenario for a dual use system is the same as the operational scenario for an application utilizing IDK and an archive utilizing ACIF.

Referring again to FIGS. 2 and 3, many applications, through the ACIF, can quickly become ISRL capable/compatible (e.g., ISRL Compatible App 208). It is possible, in accordance with the principles of the invention, for an application to use all or most of the ACIF components to rapidly become ISRL capable. Doing so can also reduce cost. The first step to becoming ISRL capable is to install ACIF and configure the components. One way to do this is as follows:

1. Use the Query Creator 136 to generate a query template (or set of templates) and define the results format desired.
2. Install the Streaming Interface 138.
3. Modify the application to be able to submit a query to the Streaming Interface 138 by:
   a. Generating code that fills in the request template;
   b. Generating code that submits the request to the Streaming Interface 138; and
   c. Generating code that reads in the returned results.

Once the ACIF 106 (e.g., ACIF 106B in FIG. 3) is installed and configured, the application (e.g., ISRL Compatible App 206) is ready to request data from any ISRL capable archive. For example, referring to FIGS. 2 and 3, when a user executes the application's ISRL query function, the following events occur:

1. The application fills in the query template with the user specified parameters.
2. The application submits the data request to the Streaming Interface 138.
3. The Streaming Interface 138 submits an ISRL data request to the applicable server or servers.
4. The Streaming Interface 138 then issues status requests to the servers until results are returned and compiles results as they come back.
5. Once all of the results are in, the Streaming Interface 138 calls the Data Conversion Engine 140 to translate the results into the selected format.
6. The Streaming Interface 138 returns the converted results to the application.
7. The application displays the data to the user.

Even though use of the ACIF 106 and the IDK 104 is a cost effective way to add ISRL capability to an application or archive, it is possible, in accordance with at least some embodiments of the invention, for a program to be developed and/or written to be ISRL capable/compatible. One reason that this is possible because ISRL is preferably an open language. Although each custom interface can be unique to the system that is developing it, the following steps help a system to become ISRL capable without relying on the ACIF or IDK:

Generally, for a system to be ISRL capable, the developers of the system should take at least these actions:
1. Develop an ISRL XML Parser.
2. Develop a way to interpret ISRL messages.
3. Create an authentication method for all incoming messages.
4. Create converters and translators to format results to user specifications.

In addition, for applications to be ISRL capable, developers of the application preferably should:
5. Develop a way for the application to send ISRL messages and parse results.
6. Develop a way to maintain the status of requests.

Further, for archives to be IRSL capable, developers of the archives preferably should:
7. Develop a web services endpoint for the archive.

As those of skill in the art will appreciate, the above steps 1-7 are not necessarily the only steps required to develop an ISRL capable/compatible interface for a given system. For example, testing and validation may be required.

Figure 4:
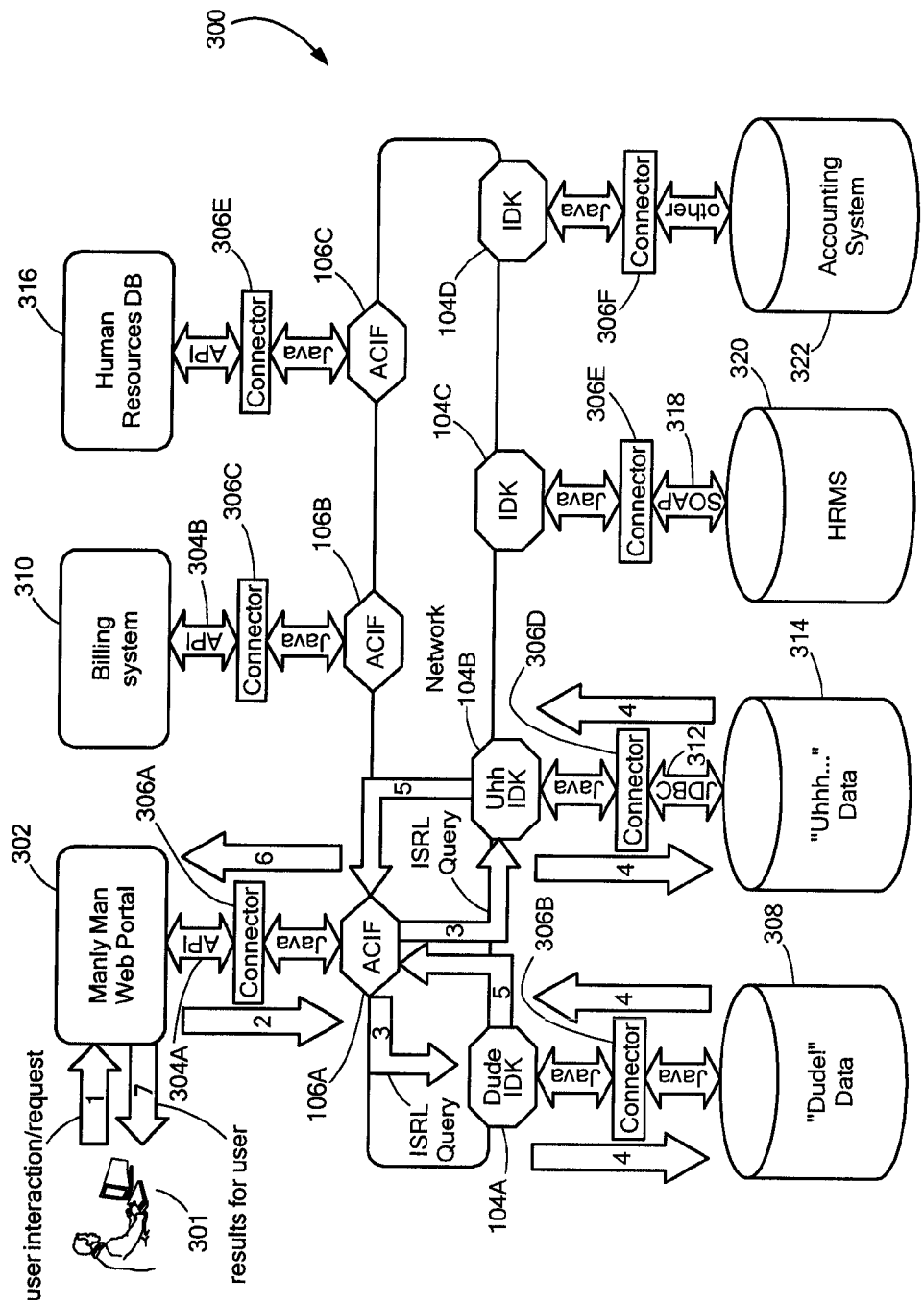
FIG. 4 is a block diagram showing interactions and data flow between applications and data sources, in accordance with one illustrative embodiment of the invention.

FIG. 4 provides a system 300 showing an example of how the ISRL works, including overall interactions and data flow, in a situation where a user 301 wants to search for customer information across dissimilar data sources. Note that the entities, names, databases, etc., shown and described in connection with FIG. 4 and the other Figures herein are provided by way of illustration only and are not limiting.

In the example of FIG. 4, the user 301 is an individual named John F. Doe, who is a marketing analyst for an organization named "Manly-Man Publishing". Note, however, that the user 301 could instead be another system, a computer application, or any other entity, including any entity(ies) acting on Doe's behalf. Manly Man Publishing has a Manly Man Web Portal 302 that is accessible to users 301 such as Doe. In this example, Doe wants to find out how many subscribers of Manly Man's most popular magazines (*Dude!* and *Uh . . .*) live in Huntington, N.Y. The magazine *Dude!* was recently acquired from an entity named "Homme Inc.", and *Dude!* uses a lightweight directory access protocol (LDAP) type of data store for its customer information database, named Dude Data 308. "*Uh . . .*" uses an ANSI standard SQL relational database named Uhhh Data 314.

As FIG. 4 illustrates, Manly-Man Publishing has additional systems (which may or may not have portals or other access points associated with them) on its networks that are accessible to various users (although not necessarily accessible to all users). As shown in FIG. 4, two of these additional systems are the Billing System 310 and its Human Resources Database 316. Manly Man Publishing uses ISRL across its enterprise to allow a single interface protocol to all of its databases. Thus, for example, a user 301 with appropriate access rights can access Billing System 210 (e.g., via the Manly Man Web Portal 302 or any compatible access method, as are well known to those of skill in the art) and search the Accounting System database 322, which uses its own unique query processing system (indicated by the arrow with the word "other" in FIG. 5). In another example, the user 301 with appropriate access rights can access the Human Resources System 316 to access the HRMS database 320 (which uses a Simple Object Access Protocol (SOAP).

FIG. 5 is a flow chart 400 further illustrating the overall interactions and data flow for the example system 300 of FIG. 4. For simplicity, the overall interactions and data flow of FIG. 5 will be described first from start to finish at a high level, followed by more detailed explanation of some of the processing blocks of FIG. 5. Note also that the overall interaction and data flow shown in FIG. 5 is applicable to other embodiments of the invention.

Referring to FIGS. 4 and 5, at block 402, the user 301 (e.g., Doe) interacts with the application (Manly Man Web Portal 302), as shown by the arrow labeled "1" in FIG. 4. When the Manly Man Web Portal application 302 receives the form from the user (block 402), the Manly Man Web Portal application 302 interacts with an ACIF 106A (block 410) via an API 304A, and a Connector 306A using Java. The Connector 306 defines how the application will form requests and interpret results, and an application developer (e.g., a licensee of the ACIF 106) can write code to create a Connector 306. More details about this interaction (labeled as "B" in block 415) are found in FIGS. 7 and 8, which are themselves described more fully below.

Figures 16, 17:
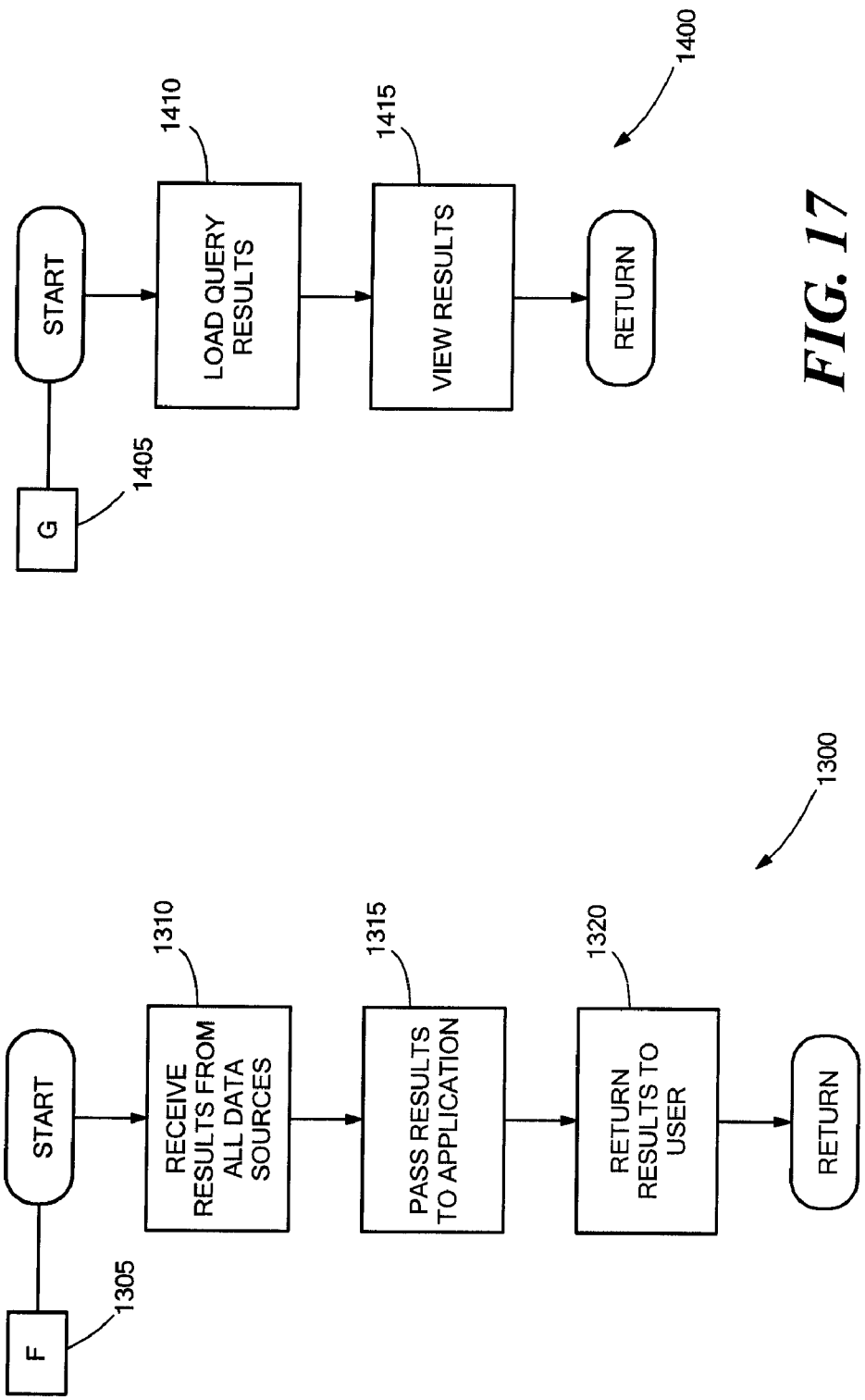
FIG. 16 is a flow chart illustrating how the ACIF receives results for the embodiment of FIG. 4.
FIG. 17 is a flow chart showing how the user views results for the embodiment of FIG. 4.

The ACIF submits an and ISRL query to data source services (block 420), a process explained in more detail in FIG. 10. Referring again to FIG. 5, for each data source, the data source services receives an ISRL query (block 430) and the data source searches for matching data (block 345). The data source returns results (block 440), and the IDK formats results (block 443) into a results message (block 445). The processing occurring in blocks 430 through 450 is explained further herein in connection with FIGS. 11 and 12. Referring again to FIGS. 4 and 5, after the IDK returns a results message (block 445), if there are more data sources (block 455), the processes of blocks 430-445 are repeated. If there are no more data sources, then the ACIF 106 returns results (block 460). FIG. 16, described further herein, illustrates how the ACIF returns results. Referring again to FIG. 5, when the results are returned, the application (e.g., Manly Man Web Portal 302) responds to the user (block 470) and the user is able to view the results (block 480).

For block 405 of FIG. 5, an example of an interaction between the user and the application of block 402 is shown in FIG. 6. Referring to FIG. 6, the user (or any other entity using the application) views and/or loads a web page with a search form (block 510). This search form could, for example be a generic search form designed to be appropriate to many different types of data sources. Alternately, a user may select or be given a search form appropriate to the application being used and/or the data source(s) being accessed. The user fills out the form (block 515) and submits the form to the application (block 520). In block 420, the ACIF 106A submits an ISRL query to Data source services.

FIG. 7 is a diagram 550 and FIG. 8 is a flow chart 600 of the interaction between the Manly Man Web Portal application 302 and the ACIF 106A, for block 410 of FIG. 5. Referring to FIGS. 7 and 8, after the Manly Man Web Portal application 302 receives a request (block 610), such the HTTPServletRequest, the Manly Man Web Portal application 302 requests creation of a query from ACIF 106A (block 615), such as by a Java method createQuery( ). Optionally, based on the request received from the user 301, the Manly Man Web Portal application 302 sets a filter is set to limit the search results (block 615), such as by Java method setFilters( ). In addition, based on the request, the Manly Man Web Portal application 302 can set a maximum number of results to return (block 635), such as by Java method setLimits( ). The Manly Man Web Portal application 302 tells ACIF 106A which data source(s) to which the request is to be sent, such as by one or more Java methods setDataSource( ). For example, in FIG. 4, the user 301 may want to search the *Dude* Data database 308 as well as the *Uhhh* Data database 314. The Manly Man Web Portal Application 302 asks the ACIF 106A to submit the query (block 640), such as by the Java method submit( ). The ACIF 106A then sends the query (block 640), such as by Java method sendQuery( ). The query is in a form compatible with ISRL, such as an ISRL XML message. Note that The ISRL query sent from the ACIF 106A in block 640 of FIG. 8 corresponds to the ISRL Query 3 of FIG. 4.

Although not described in detail herein, those of skill in the art will appreciate that many different types of interactions are possible in the implementation of FIG. 4 and similar implementations. For example, a user 301 could search one or more other databases (e.g., the HRMS 320 and/or the Accounting System 322) via the portal 302. In addition, the ACIF 106A (or any of the other ACIFs 106B, 106C) can access any one or more of the IDKs 104A, 104B, 104C, 104D, to be able to query any one of more of the databases.

FIG. 9 is a diagram of the interaction occurring when the ACIF submits an ISRL query to data source services (for block 420 of FIG. 5), and FIG. 10 is a flow chart of the interaction occurring when the ACIF 106A submits an ISRL query to data source services (e.g., any of the IDKs 104A, 104B, 104C, 104D) (block 420 of FIG. 5) for the embodiments of FIGS. 4 and 5 (Note that, in FIG. 4, a given IDK 106 can serve as data source services). Referring to FIG. 9, in block 710, the ACIF 106A looks up web service addresses for requested data sources, such as by Java method lookups. In block 715, the ACIF 106A sends a query in ISRL format to the IDK residing at each data source (e.g., the Dude IDK service 104A and the Uh . . . IDK Service 104B).

Figure 11:
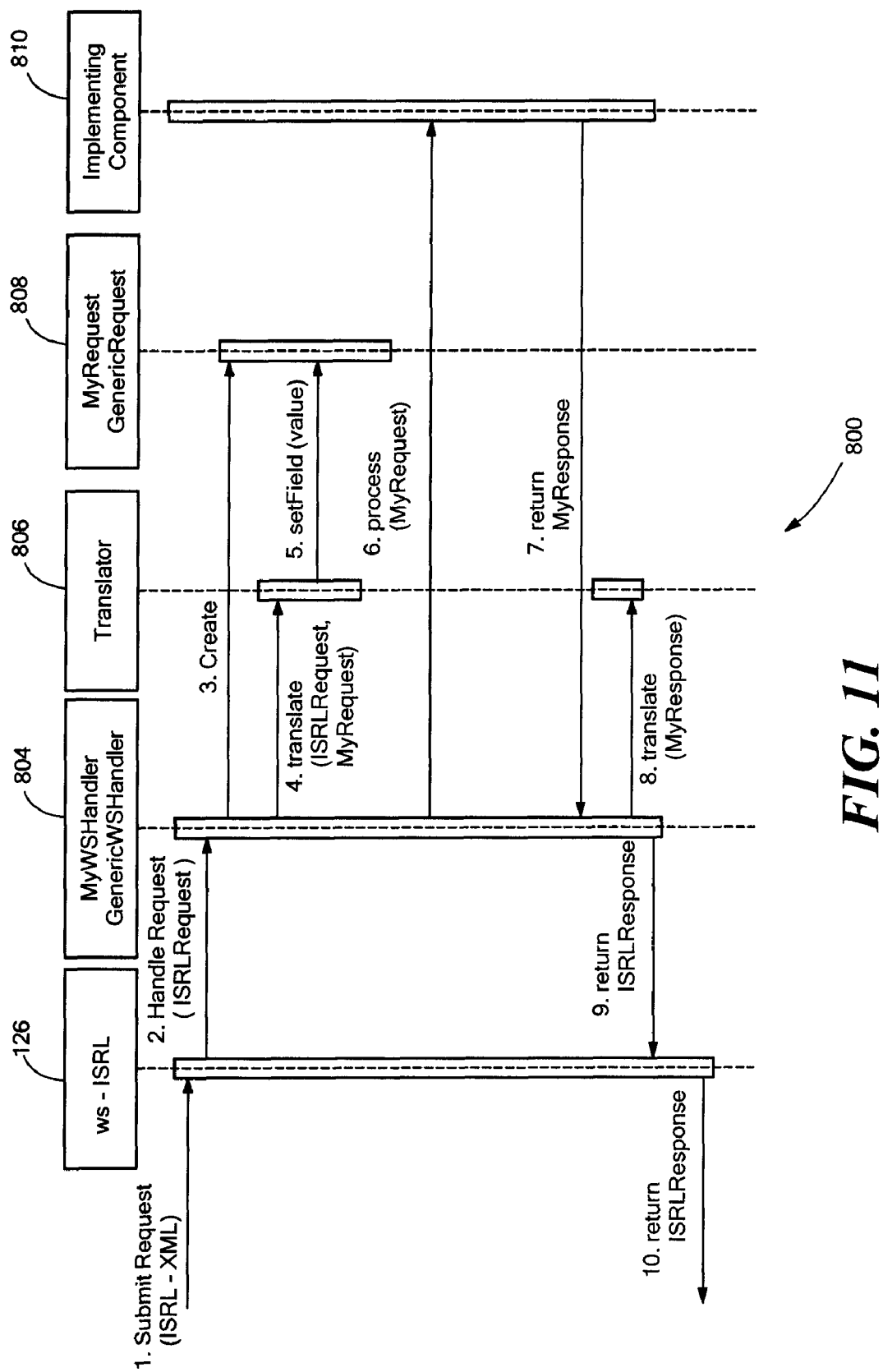
FIG. 11 is a diagram of IDK/Data source query processing for the embodiment of FIG. 4.
Figure 12:
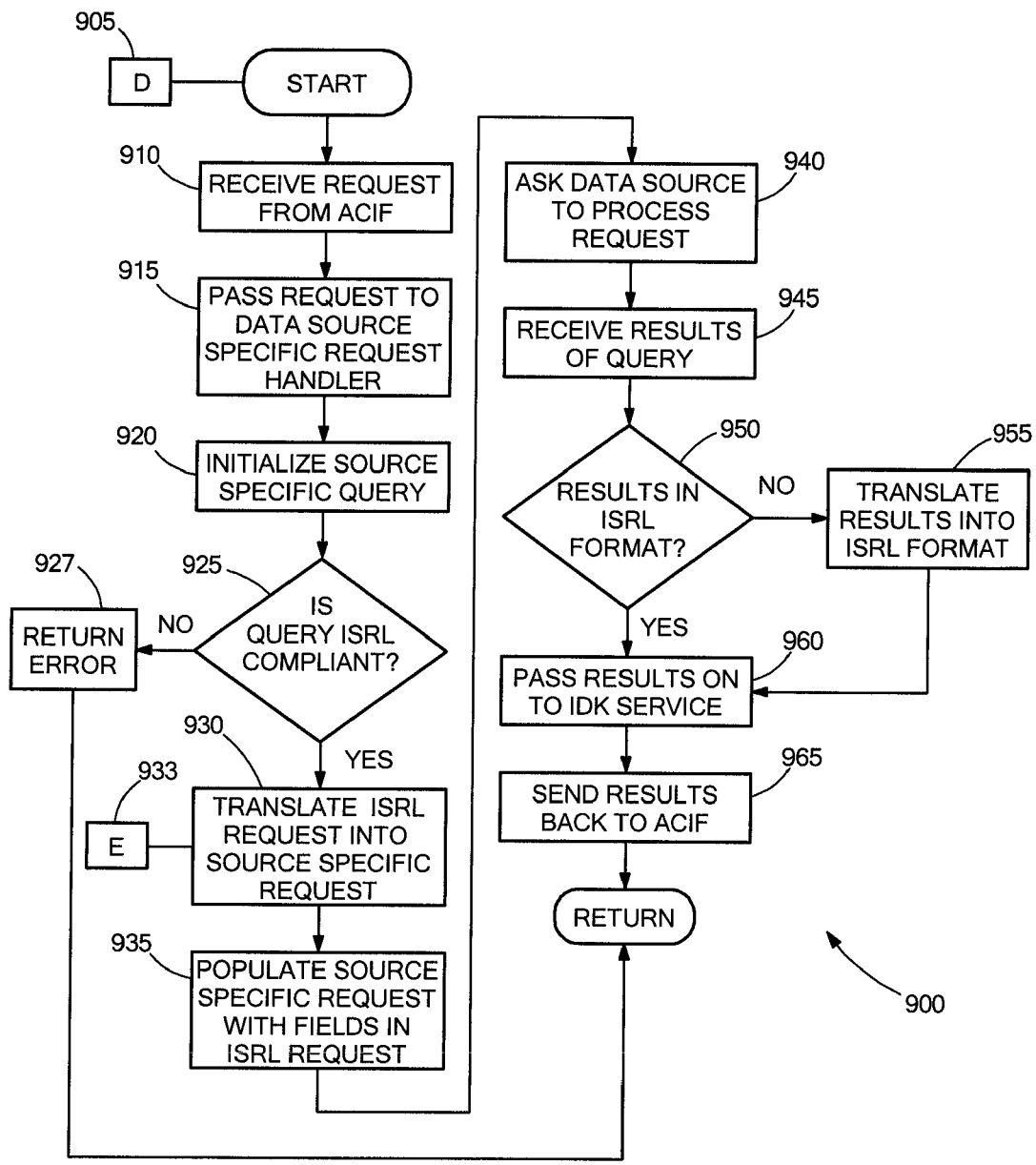
FIG. 12 is a flow chart showing IDK/Data source query processing for the embodiment of FIG. 4.

FIG. 11 is a diagram of IDK/Data source query processing for the embodiments of FIGS. 4 and 5 (e.g., for blocks 430-450 of FIG. 5). FIG. 12 is a flow chart showing in greater detail the IDK/Data source query processing occurring in blocks 430-450 of FIG. 5.

Referring to FIGS. 2, 3, 4, 11 and 12, the web services endpoint (ws_ISRL) 126 at the IDK 104 (e.g., an IDK 104A, 104B, 104C, 104D in FIG. 4) for the given data source 105, receives a request from the ACIF 106A (block 910). The request is in the form of an ISRL query. The IDK 104 passes the request to a data source specific request handler (block 915), such as the MyWSHandler::GenericWSHandler 804 of FIG. 11, via a method such as Java method HandleRequest (ISRLRequest). The data source specific request handler initializes a source specific query (block 920), such as via java method Create. In the example of FIG. 11, the source specific query is MyRequest::GenericRequest 808. If the query is not ISRL compliant (block 925) a result message is returned to the requester with an error status (block 927).

If the query is ISRL compliant, the request handler translates the ISRL request into a source specific request (block 930), such as via Java method translate(ISRLRequest,MyRequest). The translation process, which is shown as "G" in block 933, is detailed more fully in FIGS. 13 and 14, which are described more fully below. Referring again to FIGS. 11 and 12, after the ISRL request is translated into a source specific request (block 930), the source specific request is populated with the fields of the ISRL request (block 935), such as via Java method setField (value). The implementing component 810 (which could be, for example, a data source as in FIG. 4 or a data broker in communication with a data source, as in FIG. 3) is then asked to process the request, such as via Java method process (MyRequest). The results of the query are returned from the data source (block 945), such as via Java method return MyResponse. The results can be returned in a custom format or in a manner specified in the request (e.g., via SFTP).

If the results of the query are in ISRL format, processing proceeds to block 960. If the results of the query are not in ISRL format (block 950), the request handler MyWSHandler: GenericWSHandler 804 uses a translator 805 (e.g., Translation Engine 128A of FIG. 2) to convert the results into ISRL format (block 955), such as via Java method translate (MyResponse). In block 960, the request handler MyWSHandler::GenerticWSHandler 804 passes the results of the query to the IDK service ws_ISRL 802, such as via Java method return ISRLResponse. The IDK service IDK service ws_ISRL 802 sends the results back to ACIF 106A (block 965), such as via Java method return ISRL response.

Figure 14:
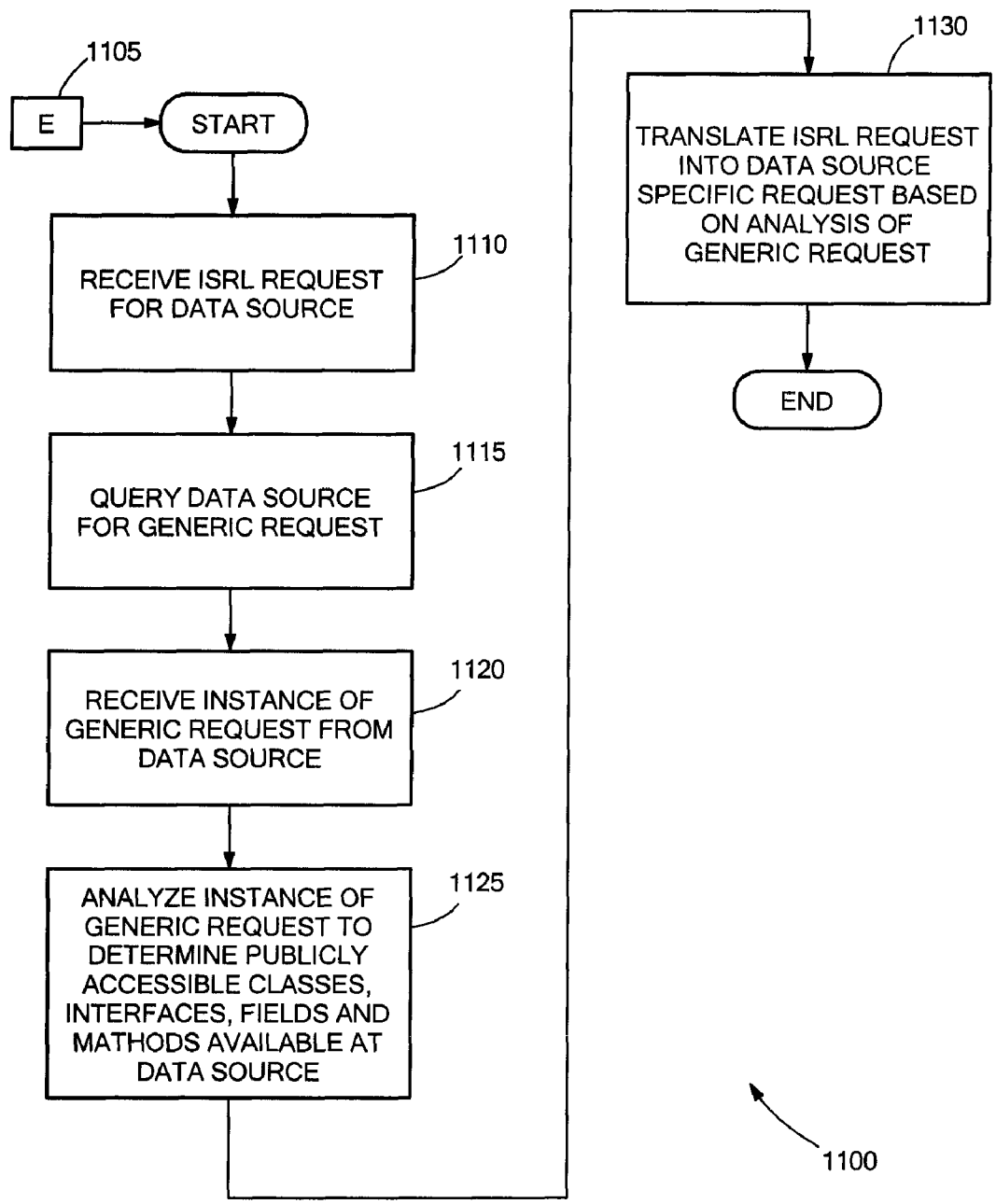
FIG. 14 is a flow chart showing translation of an ISRL request into a data source specific request, for the embodiment of FIG. 4.

The translation process referred to in block 930 of FIG. 12 is explained in greater detail in FIGS. 13 and 14. FIG. 13 is a flow diagram showing translation of in detail for the embodiment of FIG. 4, and FIG. 14 is a flow chart showing translation of an ISRL request into a data source specific request, for the embodiment of FIG. 4. Referring now to FIGS. 13 and 14, in block 1110, the translator 806 (e.g., translation engine 128A of FIG. 2) receives the ISRL request for a given data source, such as a third party server. Note that the data source can be any entity capable of providing an implantation class that at least (1) implements the Java Serializable interface and that (2) uses parameter names specified in the ISRL Definitions file 110 (FIG. 2). An example ISRL request for access to a data source is the Java method translate (ISRLRequest, ImplementationName).

The translator 806 queries the data source for the data source to provide an example of a generic request to that data source (block 1115). In response to the query from the translator 806, the data source provides to the translator 806 an instance of a generic request that is specific to that data source (block 1120). In the example of FIG. 13, the instance of the generic request is named "MyRequest". The instance "MyRequest" (i.e., the instance of the generic request) includes information about all available and/or accessible classes, interfaces, fields, and methods at the data source. That is, the data source provides information to the translator 806 about fields that are supported (e.g., by providing read/write properties for fields that are supported). Based on an analysis of the instance of the generic request, the translator 806 determines the fields that are supported (block 1124) and uses the information about the supported fields to translate the original ISRL request (block 1110) into a data source specific request (block 1130), which in the example of FIG. 13 is named MyRequest. That is, the translator 806 inspects an object that it may never have seen before and creates an ISRL translation of it. This is done by examining the object to determine which fields and methods it has. These are compared with the definitions file to find items that match or have equivalents. Using these matches or equivalents, an ISRL language version of the object is created. For translation from ISRL to a custom object, the flow is the reverse.

Figure 15:
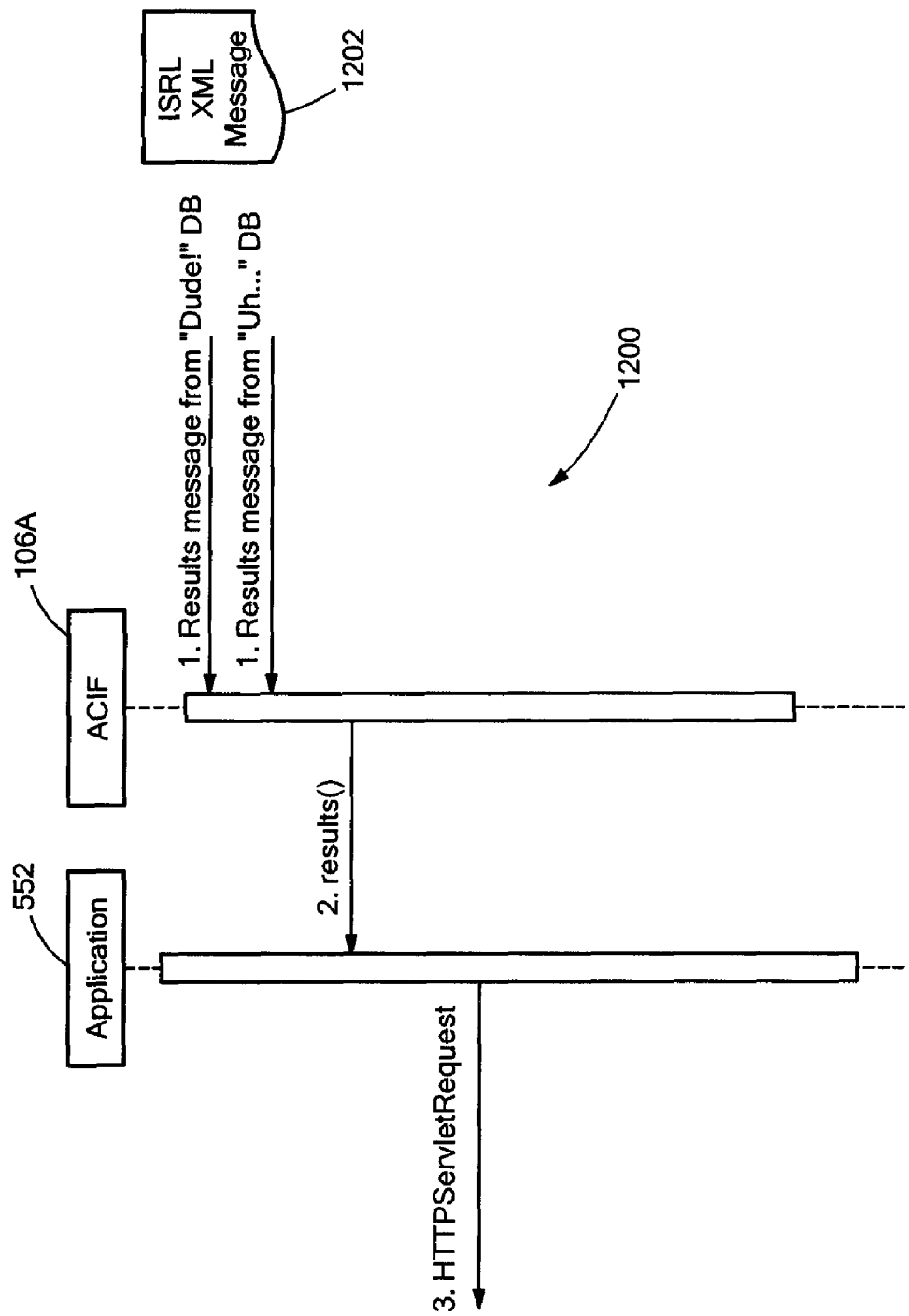
FIG. 15 is a diagram showing how the ACIF receives results for the embodiment of FIG. 4.

FIG. 15 is a diagram showing how the ACIF returns results and FIG. 16 is a flow chart illustrating how the ACIF returns results, for block 460 of FIG. 5. Referring to FIGS. 15 and 16, the ACIF receives results from all data sources (block 1310). For example, in the embodiments of FIG. 4, the ISRL XML results that are returned to ACIF 106A include a results message from the Dude Data database 308 and a results message from the Uhhh . . . Data database 214. The ACIF passes the results on to the Application 552 (clock 1315), such as the Manly Man Web Portal 302 of FIG. 4. The Application 552 then returns the results to the user (block 1320).

FIG. 17 is a flow chart showing how the user views results n block 475 of FIG. 5. Referring to FIG. 17, in this example, the user loads the query results (block 1410) and views the results (clock 1415). In another example, an application loads the query results. The ISRL as described above provides, in at least some embodiments, a solution that allows various applications and data sources to talk to each other without use of middleware. For example, at least some embodiments of the ISRL can be implemented to create so-called "points of entry" where an application, such as a special purpose application like a Tactical and Operational SIGINT application, can be fielded an able to use data from any collection source. Further, embodiments of the invention can be used to help reduce the need for a developer to select a single data source and develop the application for it specifically. This can be especially advantageous for applications such as Missions Systems Integration, where different programs need to be able to talk to each other.

As those skilled in the art will recognize, the invention described herein can be modified to accommodate and/or comply with any many different technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It should also be appreciated that the flow diagrams and flow charts provided herein do not depict the syntax of any particular programming language (although in some instances methods from the Java programming language have been provided by way of example). Rather, the flow diagrams and flow charts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit and scope of the invention.

Further, in describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A computer-implemented method for a client to query a data source, the method comprising:
    receiving from a client a first query to a data source, wherein the client and data source are both in operable communication with a computer system having a processor and memory, the client configured to send queries and receive responses in accordance with a first format, the data source configured to receive queries and send responses in accordance with a second format, wherein, prior to an initial communication between the client and data source, the client and the data source do not have access to information relating to each other's respective formats, and wherein the data source has an interface providing an implementation class that is configured to save a state of an object in a manner permitting the object to be transmitted as data and recreated at a different place or time;
    receiving from the data source an instance of a generic request in accordance with the second format, the instance of the generic request providing information about at least one query element that is supported in a data source specific request in accordance with the second format, the information about the at least one query element including at least read/write properties of the at least one query element;
    analyzing, using the processor, the received instance of the generic request to determine at least one publicly accessible query element supported at the data source;
    determining, using the processor and based at least in part on the read/write properties of the query element, whether the at least one publicly accessible query element uses at least one parameter name that has a match or equivalent in a predetermined definitions file stored in the memory, the predetermined definitions file being associated with at least one standard to which both the client and data source agree to adhere; and
    converting, using the processor and based at least in part on the analyzing of the instance of the generic request and on any matches or equivalents to the parameter name, the first query to a second query, where the second query is in accordance with the second format and includes the at least one query element that is supported in the data source specific request.

2. The method of claim 1, wherein the query element comprises at least one element selected from the group consisting of a field, class, interface, and method.

3. The method of claim 1, wherein the first format is a format different from the second format.

4. The method of claim 1, wherein the first format comprises a format associated with a predetermined communications language.

5. The method of claim 4, further comprising:
    receiving an initial request from the client to the data source, the initial request being written in a first language;
    if the first language is not the same as the predetermined communications language, converting, using the processor, the initial request into a corresponding initial request written in the predetermined communications language; and
    using the initial request as the first query.

6. The method of claim 4, wherein the predetermined communications language is constructed and arranged to enable the client and the data source to communicate with each other without substantial advanced knowledge of each other's respective formats.

7. The method of claim 4, wherein the predetermined communications language is characterized by at least one standard to which both the client and the data source agree to adhere.

8. The method of claim 7, wherein at the least one standard defines a message written in the predetermined communications language, the message selected from the group consisting of request messages and response messages.

9. The method of claim 7, wherein the at least one standard includes a repository of variables stored in the memory and used by at least one of the client or the data source, the repository of variables comprising at least one variable selected from the group consisting of parameters, parameter names, parameter precision, parameter value, parameter units, parameter relationships, types, filters, minimum values, maximum values, ranges, and units of measurement.

10. The method of claim 9, wherein the repository of variables includes at least one predetermined parameter name and wherein the implementation class of the data source uses the at least one predetermined parameter name.

11. The method of claim 10, wherein the data source interface comprises a Java Serializable Interface.

12. The method of claim 1, further comprising:
    querying the data source using the second query;
    receiving an initial response from the data source; and
    if the initial response is not written in a predetermined communications language, converting, using the processor, the initial response into an initial response written in the predetermined communications language.

13. The method of claim 12, further comprising:
    providing a requested format for results; and
    formatting the initial response in accordance with the requested format for results.

14. The method of claim 1, wherein the data source interface comprises a Java Serializable Interface.

15. The method of claim 1, further comprising:
    receiving from the data source an instance of a generic request in accordance with the second format, the instance of the generic request providing information about all available query elements that are supported in a data source specific request in accordance with the second format, including at least read/write properties of each of the available query elements.

16. The method of claim 1, wherein the predetermined definitions file further comprises a repository of variables, including at least one variable selected from the group consisting of parameters, parameter names, parameter precision, parameter value, parameter units, parameter relationships, types, filters, minimum values, maximum values, ranges, and units of measurement.

17. A computer program product, comprising a computer-readable medium having computer-readable program code embodied thereon, the computer-readable program code executable by a computer system having a processor and memory to enable a first entity in operable communication with the computer system to query a second entity in operable communication with the computer system for a result, the computer-readable program code of the computer program product executing on the computer system to implement a system comprising:

a language specification component stored on the memory, the language specification component defining a communications language by which the first and second entities can communicate with each other even if the first entity and the second entity do not have access to information relating to how each entity sends or responds to queries;

an interface between the first entity and the second entity, the interface operable to:

receive from the second entity an instance of a generic request that is specific to the second entity, the instance of the generic request providing information about at least one query element that is supported in a second-entity specific request, the information about the at least one query element including at least read/write properties for the query element, wherein the second entity has an interface providing an implementation class configured to save a state of an object in a manner permitting the object to be transmitted as data and recreated at a different place or time;

analyze, using the processor, the received instance of the generic request to determine at least one publicly accessible query element supported at the second entity;

determine, using the processor and based at least in part on the read/write properties of the query element, whether the at least one publicly accessible query element uses at least one parameter name that has a match or equivalent in a predetermined definitions file stored in the memory, the predetermined definitions file being associated with at least one standard to which both the client and data source agree to adhere; and convert, using the processor and based at least in part on the analyzing of the instance of the generic request and on any matches or equivalents to the parameter name, a first query from the first entity to the second entity into a second query, wherein the second query includes the at least one query element that is supported in the second-entity specific request.

18. The computer program product of claim 17, wherein the language specification component further comprises:

a repository of information relating to at least one parameter used in the system; and a message format for messages written in the communications language, the message format comprising a data description section defining, for a query, a preferred format of a result and defining, for a response to the query, an actual format of a returned result.

19. The computer program product of claim 18 wherein, the interface is further configured to convert a query message written in the communications language into a format specific to the second entity.

20. The computer program product of claim 19 wherein the repository further comprises at least one parameter name and wherein the interface is configured operable to convert the query message provided that the second entity uses the at least one parameter name specified in the repository.

21. The computer program product of claim 20 wherein the interface is configured to convert the query message provided that the second entity implements an interface configured to save the state of an object in a manner that enables the object to be recreated at a different place or time.

22. A system enabling a requester using a first computer interface to query a computerized database accessible via a second computer interface, the system implemented using a computer system having a processor and a memory and comprising:

means for defining and storing in the memory a communications language usable by the first and second computer interfaces, the communications language allowing the requester and database to communicate without requiring that the first and second computer interfaces first have access to information relating to each other's respective interfaces, wherein the second computer interface provides an implementation class configured to save a state of an object in a manner permitting the object to be transmitted as data and recreated at a different place or time;

means for analyzing, using the processor, an instance of a generic query to the database, the instance providing information relating to read/write properties of at least one query element in generic query, to determine if the at least one query element in the generic query is supported by the communications language;

means for determining, using the processor and based at least in part on the read/write properties of the query element, whether the at least one publicly accessible query element uses at least one parameter name that has a match or equivalent in a predetermined definitions file stored in the memory, the predetermined definitions file being associated with at least one standard to which both the client and data source agree to adhere; and means for converting, using the processor and based at least in part on the analysis of the generic query and on any matches or equivalents to the parameter name, a message written in the communications language to a format usable by either or both of the first computer interface and the second computer interface.

23. The system of claim 22, further comprising means for formatting, using the processor, a response from the data source into a format compatible with a requested format provided in a query from the requester.

* * * * *

UNITED STATES PATENT AND TRADEMARK OFFICE
CERTIFICATE OF CORRECTION

PATENT NO. : 7,747,569 B2
APPLICATION NO. : 11/534402
DATED : June 29, 2010
INVENTOR(S) : Comi et al.

It is certified that error appears in the above-identified patent and that said Letters Patent is hereby corrected as shown below:

Col. 1 line 52, delete "user" and replace with -- users --.

Col. 2 line 62, delete "Hyptertext" and replace with -- Hypertext --.

Col. 4 line 31, delete "is block" and replace with -- is a block --.

Col. 4 line 37, delete "user an" and replace with -- user, an --.

Col. 4 line 50, delete "and ISRL" and replace with -- an ISRL --.

Col. 6 line 7, delete "as a the" and replace with -- as the --.

Col. 7 line 48, delete "IRSL" and replace with -- ISRL --.

Col. 8 line 56 delete "is a used," and replace with -- is used, --.

Col. 9 line 64, delete "of invention," and replace with -- of the invention, --.

Col. 10 line 28, delete "file," and replace with -- file. --.

Col. 11 line 52, delete "and make" and replace with -- can make --.

Col. 13 line 7, delete "is" and replace with -- is a --.

Col. 13 line 26, delete "built in" and replace with -- built-in --.

Col. 13 line 28, delete "ACIF'" and replace with -- ACIF. --.

Col. 14 line 18, delete "processing" and replace with -- processing. --.

Col. 14 line 23, delete "format" and replace with -- format. --.

Signed and Sealed this

Twenty-eighth Day of September, 2010

David J. Kappos
*Director of the United States Patent and Trademark Office*

CERTIFICATE OF CORRECTION (continued)
U.S. Pat. No. 7,747,569 B2

Col. 14 line 26, delete "the in the" and replace with -- in the --.

Col. 14 line 56, delete "e.g.," and replace with -- (e.g., --.

Col. 16 line 19, delete "possible because" and replace with -- possible is because --.

Col. 17 line 38, delete "an and" and replace with -- an --.

Col. 18 line 5, delete ", such the" and replace with -- , such as the --.

Col. 18 line 10, delete "is set to" and replace with -- to --.

Col. 18 line 45, delete "lookups" and replace with -- lookup(). --.

Col. 19 line 21-22, delete "WSHandler:" and replace with -- WSHandler:: --.

Col. 19 line 22, delete "Genertic" and replace with -- Generic --.

Col. 19 line 28, delete "IDK service IDK service" and replace with -- IDK service --.

Col. 20 line 17, delete "n" and replace with -- in --.

Col. 20 line 27, delete "an able to use" and replace with -- and able to use --.

Col. 20 line 36, delete "any many" and replace with -- many --.

Col. 20 line 49, delete "systems" and replace with -- system --.

Col. 24 line 12, delete "configured operable to" and replace with -- configured to --.

Col. 24 line 39, delete "in generic" and replace with -- in the generic --.